United States Patent
Nagase et al.

(10) Patent No.: US 9,955,118 B2
(45) Date of Patent: Apr. 24, 2018

(54) INFORMATION PROCESSING APPARATUS, COMMUNICATION SYSTEM, AND RECORDING MEDIUM

(71) Applicants: Tatsuya Nagase, Kanagawa (JP); Takahiro Asai, Kanagawa (JP)

(72) Inventors: Tatsuya Nagase, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/208,995

(22) Filed: Jul. 13, 2016

(65) Prior Publication Data

US 2017/0019637 A1    Jan. 19, 2017

(30) Foreign Application Priority Data

Jul. 15, 2015 (JP) .................................. 2015-141531

(51) Int. Cl.
*H04N 7/15* (2006.01)
*H04L 29/06* (2006.01)
*H04N 7/14* (2006.01)

(52) U.S. Cl.
CPC ......... *H04N 7/152* (2013.01); *H04L 65/1066* (2013.01); *H04L 65/1069* (2013.01); *H04L 65/403* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 8,769,001 B2 | 7/2014 | Ohwada | |
| 8,838,699 B2 | 9/2014 | Barlow | |
| 8,929,257 B1 | 1/2015 | Goepp et al. | |
| 2010/0172360 A1* | 7/2010 | Maes | H04L 12/5692 370/401 |
| 2010/0259593 A1 | 10/2010 | Beers et al. | |
| 2012/0120184 A1 | 5/2012 | Fornell et al. | |

(Continued)

FOREIGN PATENT DOCUMENTS

| | | |
|---|---|---|
| EP | 2 863 632 A1 | 4/2015 |
| JP | 2011-205612 | 10/2011 |

(Continued)

OTHER PUBLICATIONS

Extended European Search Report dated Dec. 1, 2016 in Patent Application No. 16178961.5.

*Primary Examiner* — Creighton Smith
(74) *Attorney, Agent, or Firm* — Oblon, McClelland, Maier & Neustadt, L.L.P.

(57) ABSTRACT

An information processing apparatus for controlling establishment of communication between a plurality of communication terminals is disclosed. The information processing apparatus includes a communication establishing unit configured to cause, while communication via a first session is established between the plurality of communication terminals, the plurality of communication terminals to establish communication via a second session; and a communication starter configured to cause the plurality of communication terminals to start the communication via the second session upon confirming that the communication via the second session is established between the plurality of communication terminals.

8 Claims, 11 Drawing Sheets

(56) References Cited

U.S. PATENT DOCUMENTS

2014/0101727 A1     4/2014   Okuyama et al.
2014/0324975 A1    10/2014   Tamura
2016/0308931 A1*   10/2016   Wu ....................... H04L 65/607

FOREIGN PATENT DOCUMENTS

JP          2014-075074       4/2014
JP          2014-233068      12/2014
WO      WO 2016/143260 A1    9/2016

* cited by examiner

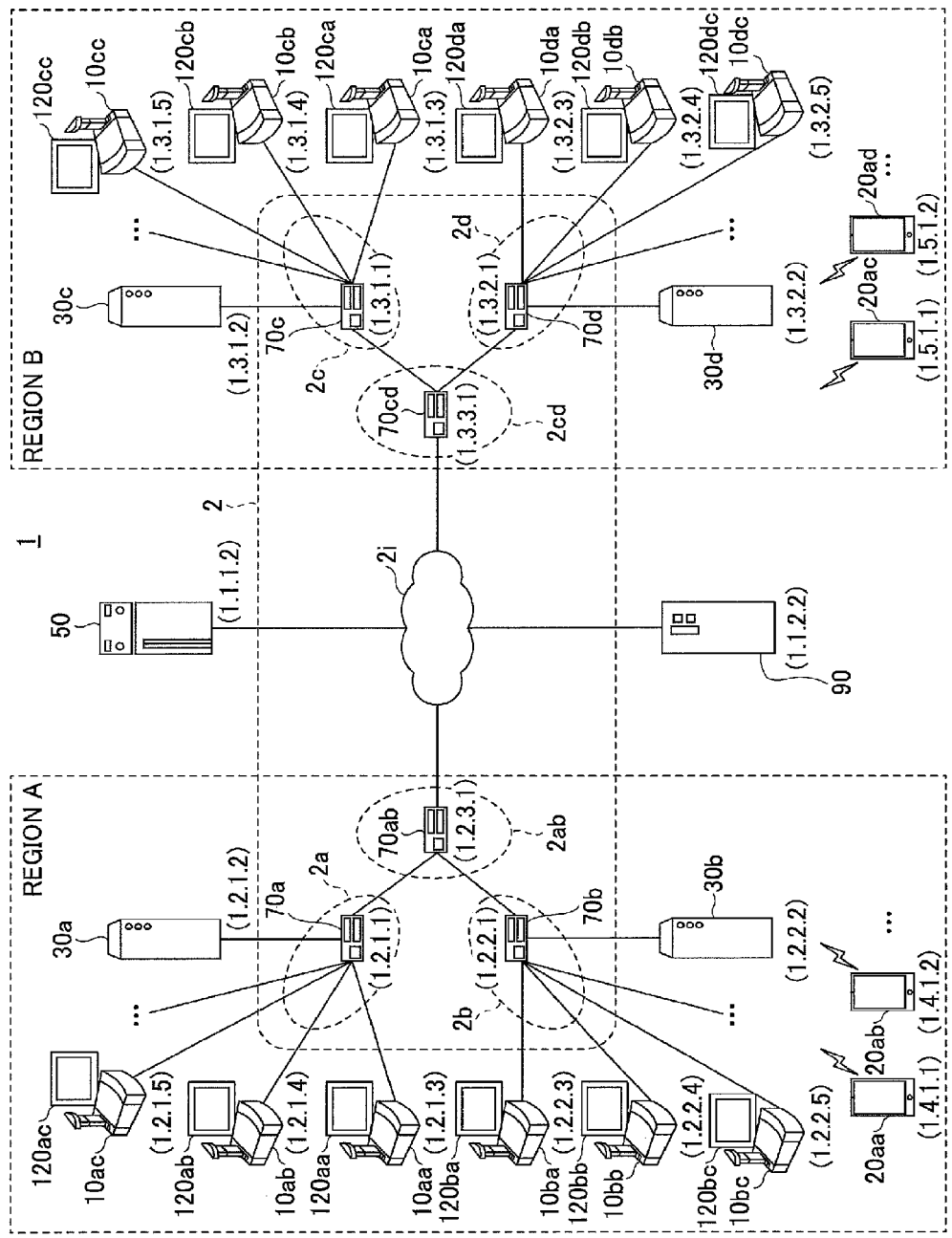

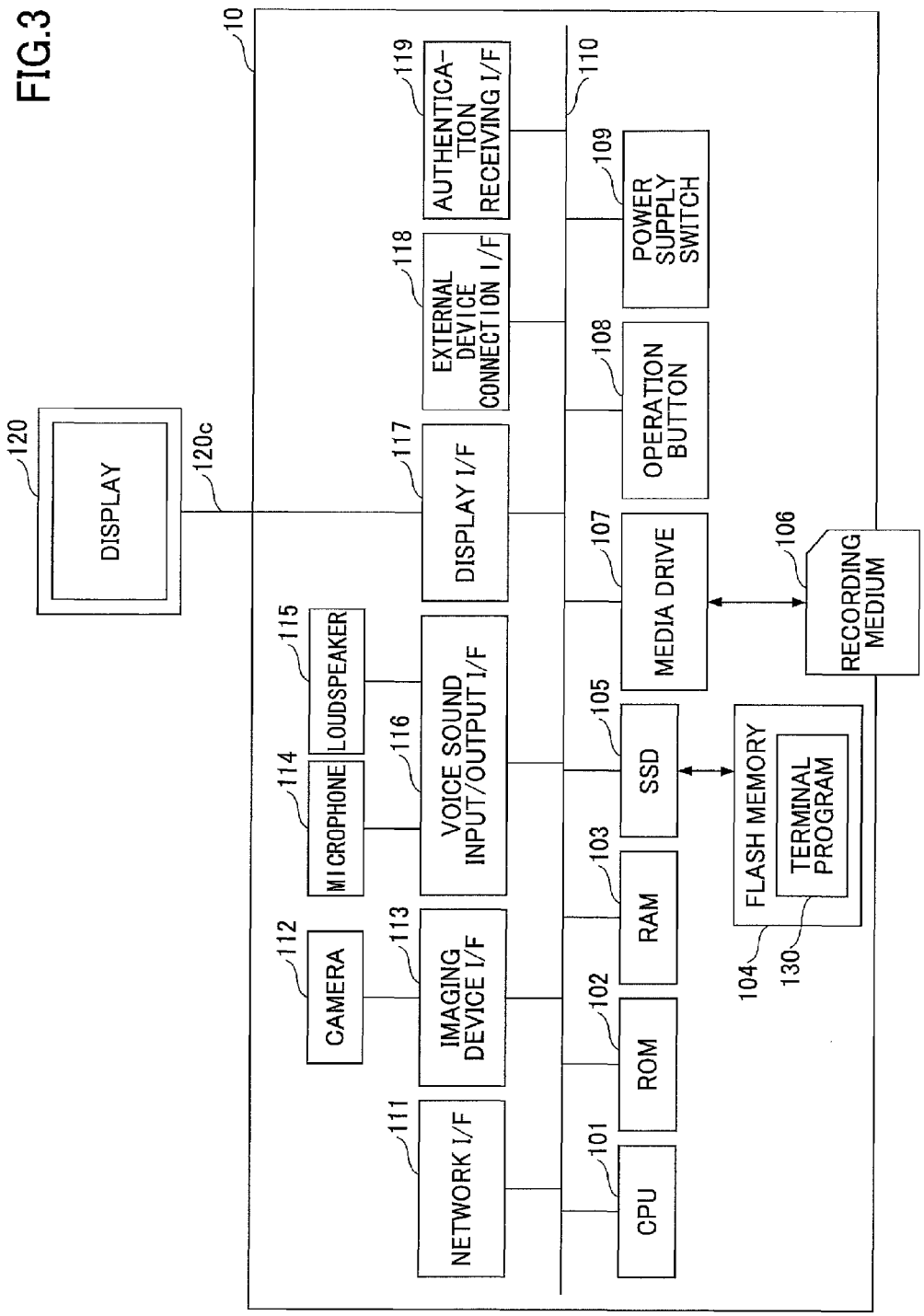

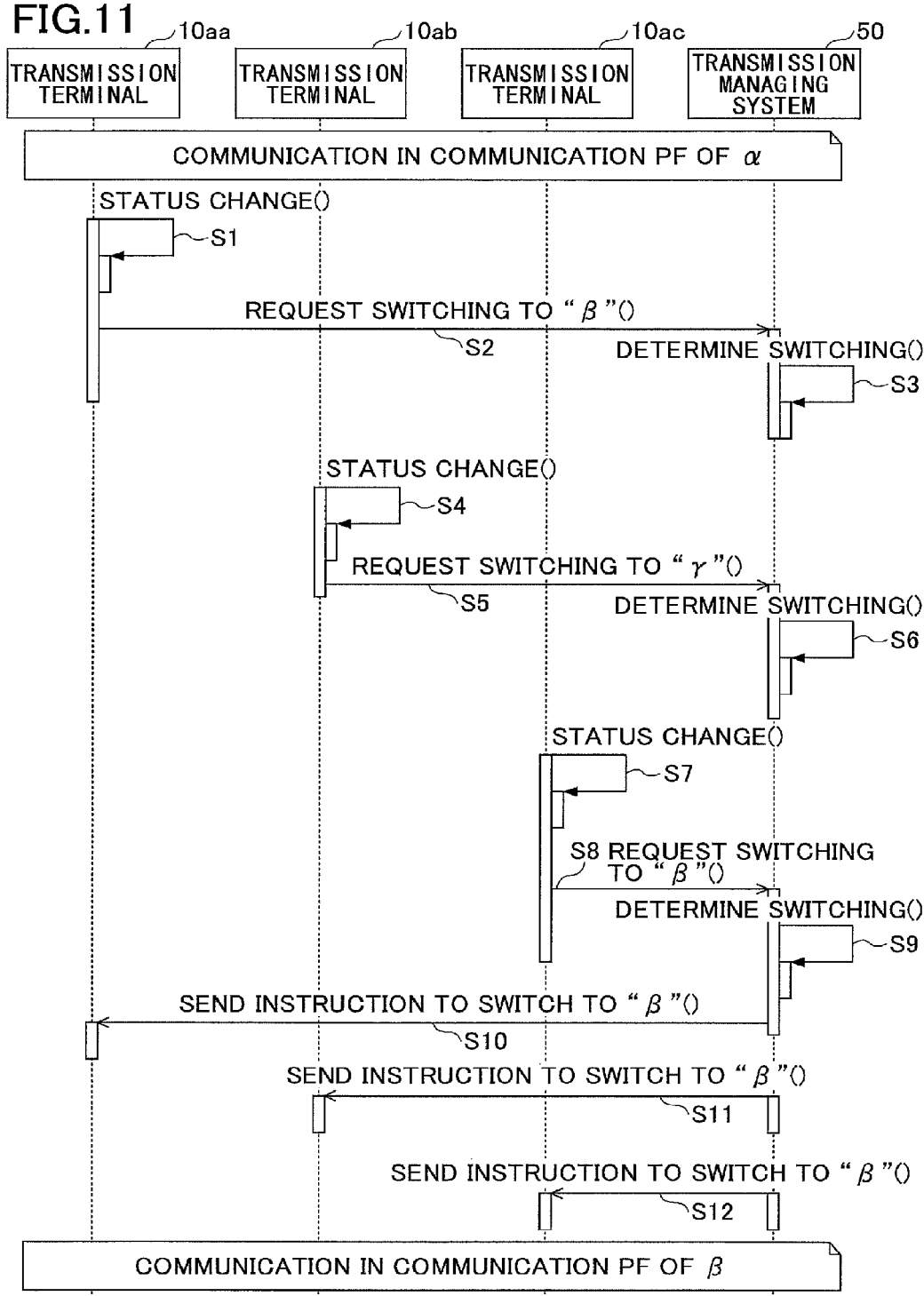

INFORMATION PROCESSING APPARATUS, COMMUNICATION SYSTEM, AND RECORDING MEDIUM

BACKGROUND OF THE INVENTION

1. Field of the Invention

The present invention relates to an information processing apparatus, a communication system, and a recording medium.

2. Description of the Related Art

There are video conference systems as an example of transmission systems that perform a video conference among a plurality of terminal devices via a communication network such as the Internet. Communication platforms (an infrastructure system or a mechanism to perform communication) for transmitting image data and voice sound data among a plurality of transmission terminals have become increasingly diversified. Accordingly, even if a video conference is performed between the same locations, there may be a situation where a service provider or a user can employ two or more from the plurality of communication platforms.

In the related art, there is a technique of selecting a suitable platform from the plurality of communication platforms (see Patent Document 1, for example). Patent Document 1 discloses a technique of automatically selecting a platform that performs a video conference from a plurality of platforms supported by a system, such that the video conference is performed with reduced risk of security.

RELATED ART DOCUMENT

[Patent Document 1] U.S. Pat. No. 8,838,699

SUMMARY OF THE INVENTION

In an embodiment, an information processing apparatus for controlling establishment of communication between a plurality of communication terminals is provided. The information processing apparatus includes a communication establishing unit configured to cause, while communication via a first session is established between the plurality of communication terminals, the plurality of communication terminals to establish communication via a second session; and a communication starter configured to cause the plurality of communication terminals to start the communication via the second session upon confirming that the communication via the second session is established between the plurality of communication terminals.

BRIEF DESCRIPTION OF THE DRAWINGS

Other objects and further features of embodiments will become apparent from the following detailed description when read in conjunction with the accompanying drawings, in which:

FIG. 2 is a schematic view depicting a transmission system according to an embodiment of the present invention;

FIG. 3 is a hardware configuration diagram of a transmission terminal according to an embodiment of the present invention;

FIG. 11 is a sequence diagram depicting a procedure by which a transmission management system according to an embodiment of the present invention determines whether to switch a communication PF.

DESCRIPTION OF THE EMBODIMENTS

In the following, embodiments of the present invention will be described based on Examples with reference to the accompanying drawings.

It is an object of at least one embodiment of the present invention to provide an information processing apparatus that prevents discontinuation that may occur upon switching between communication platforms.

Example 1

<Overview of Switching of Communication Platforms>

Figure 1A:
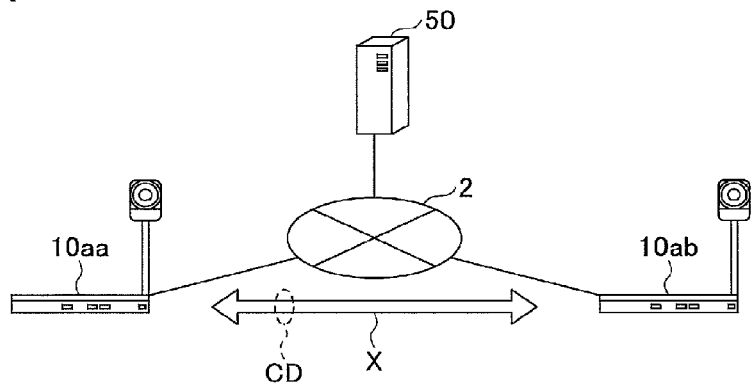
FIG. 1A is a diagram illustrating switching of communication platforms according to an embodiment of the present invention.
Figure 1B:
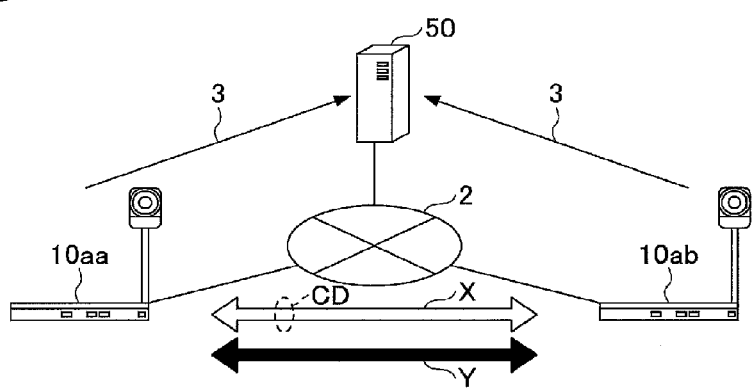
FIG. 1B is a diagram illustrating switching of communication platforms according to an embodiment of the present invention.
Figure 1C:
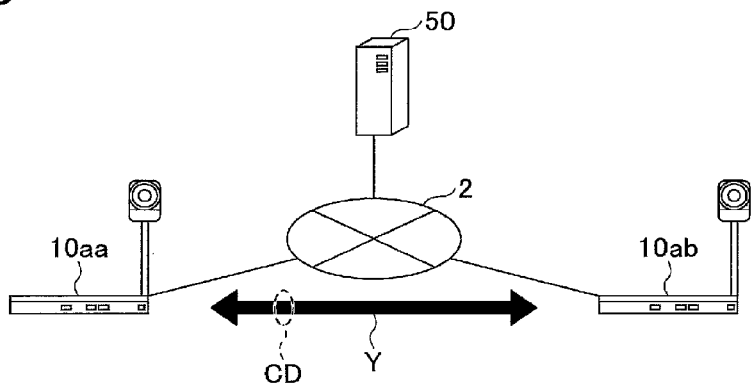
FIG. 1C is a diagram illustrating switching of communication platforms according to an embodiment of the present invention.

FIGS. 1A to 1C are diagrams illustrating switching of communication platforms according to this example of the present invention. In FIG. 1A, transmission terminals 10*aa* and 10*ab* (an example of a communication terminal) and a transmission managing system 50 are connected a communication network 2. The transmission managing system 50 may be a server that controls communication connection between the transmission terminals 10*aa* and 10*ab*. The transmission managing system 50 reports (signals) the presence of the transmission terminals 10*aa* and 10*ab* to both of the transmission terminals 10*aa* and 10*ab* and allows the transmission terminals 10*aa* and 10*ab* to start communication. The transmission terminals 10*aa* and 10*ab* transmit and receive content data CD (image data and voice sound data) in a one-to-one (Peer To Peer) communication form using an Application Interface (API) such as Web Real-Time Communication (WebRTC), for example. Alternatively, communication may be performed via a relay device. This communication platform is referred to as a communication platform (hereafter "communication PF") of X.

Then, it is assumed that the transmission terminal 10*aa* or 10*ab* detects a change of a communication status (such as a change of a communication band or a change of the number of locations). The transmission managing system 50 determines switching of the communication PF in response to the change of the communication status. First, the transmission managing system 50 causes the transmission terminals 10*aa* and 10*ab* to establish a session of a communication PF called Y. As illustrated in FIG. 1B, the transmission terminals 10*aa* and 10*ab* establish the session of the communication PF of Y while transmitting and receiving the content data CD in a communication PF of X. In addition, the communication PFs of X (first session) and Y (second session) may use different video and audio compression methods and different communication paths.

When the session is established, each of the transmission terminals 10*aa* and 10*ab* transmits a session establishment report 3 to the transmission managing system 50. In accordance with this, the transmission managing system 50 confirms that switching of the communication PF is prepared.

Next, as illustrated in FIG. 1C, the transmission managing system 50 sends an instruction to switch to the communication PF of Y to the transmission terminals 10*aa* and 10*ab* and disconnects the session of the communication PF of X.

In this manner, when performing switching of a communication PF, a transmission system 1 in this example establishes a session of a communication PF to be used after switching while maintaining communication in a communication PF used before the switching. When sessions are established in all transmission terminals 10 (communication is prepared), the switching of the communication PF is performed. Accordingly, time required for switching of the communication PF is reduced and a user is less likely to feel disconnection of communication.

<Communication PF>

A communication PF used in this example is described. The communication PF refers to an infrastructure system or a mechanism for communication obtained by combining at least one of a call control method, a communication path, a video and audio compression method, and the like. For example, if the example of FIG. 1A uses the communication PF where the API called WebRTC is used for call control and the transmission terminals 10*aa* and 10*ab* communicate with each other, in FIG. 1B or FIG. 1C, the communication PF is switched such that the transmission terminals 10*aa* and 10*ab* perform communication via a relay device or a video and audio compression method is changed while the same API called WebRTC is used.

In addition, elements that may constitute the communication PF include but are not limited to the following.

Call control including (1) H.323 (communication via a relay device), (2) WebRTC (described above), (3) Session Initiation Protocol (SIP), (4) Protocol extended from SIP, (5) Protocol of Instant Messenger, (6) Protocol using the MESSAGE method of SIP, (7) Protocol of Internet Relay Chat (IRC), (8) Protocol extended from Instant Messenger, and the like.

Communication path including presence or absence of a relay device 30, switching of the relay device 30, switching of functions (interfaces) within the same relay device 30, and the like.

Video compression method including H.264, H.264/AVC1 H.264/SVC, H.265/HEVC, MPEG4, and the like.

Audio compression method including G.711/G.722, Speex, Opus, iSAC/iLBC, and the like.

The video compression method and the audio compression method may be switched independently. Alternatively, the video compression method and the audio compression method may be switched at the same time. For example, if switching of the call control or the communication path is accompanied with the switching of the video compression method and the audio compression method, the video compression method and the audio compression method are switched at the same time. If switching of the call control or the communication path is not accompanied with the switching of the video compression method and the audio compression method, none of the video compression method and the audio compression method need to be switched, or both or one of the video compression method and the audio compression method may be switched. Further, it is possible to switch the video compression method or the audio compression method independently regardless of the call control or the communication path.

In addition, the SIP of the call control may be classified into a communication protocol in an application layer. Further, as for communication protocols such as Real-time Transport Protocol (RTP), HTTP, HTTPs, TCP/IP, and UDP/IP, a suitable one may be used for each call control. Accordingly, the communication protocol may be switched together with the call control or the same communication protocol may be used even when the call control is switched.

<As for Technical Term>

In the description, preparation for transmission or reception of content data CD between two or more transmission terminals 10 is referred to as establishment of a session. While there is no strict definition of a session, a series of communications having related contents is called a session, for example. The establishment of a session may be called establishment of communication.

Further, in the present example, while the session is established, content data CD is transmitted and received between two or more transmission terminals 10. The content data CD includes display data such as a document file displayed by an information processing apparatus connected to the transmission terminal 10.

Further, a communication ID of the present example indicates identification information such as a language, characters, symbols, or various types of marks to be used to uniquely identify each transmission terminal or a user of the transmission terminal. Further, the communication ID may be identification information in which at least two of the language, the characters, the symbols, and various types of marks above are combined.

<Configuration of Transmission System 1>

FIG. 2 is a schematic view depicting the transmission system 1 according to an embodiment of the present invention. The transmission system 1 (an example of a communication system) is a communication system for mutually communicating information and feelings among a plurality of transmission terminals via the transmission managing system 50. Examples of the transmission system 1 include a video conference system, a videophone system, a voice conference system, a voice phone system, a Personal Computer (PC) screen sharing system, a text chat system, and the like. Further, the transmission system 1 includes a data providing system that transmits content data unilaterally from one transmission terminal to another transmission terminal via the transmission managing system 50.

In the present example, a system capable of holding a video conference is assumed and described as an example of a communication system.

The transmission system 1 depicted in FIG. 2 includes a plurality of transmission terminals (10*aa*, 10*ab*, . . . ), a plurality of mobile terminals (20*aa*, 20*ab*, . . . ), display screens (120*aa*, 120*ab*, . . . ) for the transmission terminals (10*aa*, 10*ab*, . . . ), a plurality of the relay devices (30*a*, 30*b*, . . . ), the transmission managing system 50, and a program providing system 90.

The transmission terminals 10 transmit and receive image data and voice sound data as an example of content data. In other words, the transmission terminals 10 may be video conference terminals capable of using video conference service. In this example, the transmission terminal 10 is assumed to be a terminal dedicated to a video conference.

The mobile terminals 20 transmit and receive image data and voice sound data as an example of content data. The mobile terminals 20 may be able to transmit or receive text data. In other words, the mobile terminals 20 may use not only the video conference but also a text chat. In this example, the mobile terminal 20 may be a tablet terminal, a mobile phone, a smartphone, a Personal Digital Assistant (PDA), a wearable PC, a game console, a general-purpose PC terminal, a car navigation terminal, an electronic whiteboard, a projector, a monitoring camera, industrial equipment having a communication function, or the like unless otherwise specified. Further, the industrial equipment includes office equipment such as a Multifunction Peripheral/Printer/Product (MFP), medical equipment such as an endoscope, and agricultural equipment such as a cultivator. The wearable PC includes a wristwatch, a head-mounted display, and the like. In addition, the mobile terminal 20 is wirelessly connected to the communication network 2 via a mobile communication network or Wireless Fidelity (WiFi), for example.

As will be clear from the following hardware configuration, the transmission terminal 10 and the mobile terminal 20 are each referred to as information processing apparatuses.

The transmission terminal 10 and the mobile terminal 20 are managed by the transmission managing system 50 that manages call control of the transmission system 1.

In the following, a given transmission terminal among the plurality of transmission terminals (10*aa*, 10*ab*, . . . ) is described as a "transmission terminal 10" and a given mobile terminal among the plurality of mobile terminals 20 (20*aa*, 20*ab*, . . . ) is described as a "mobile terminal 20." The same applies to the display 120, the relay device 30, and a router 70.

Further, a terminal that sends a request for starting a video conference from one transmission terminal 10 or mobile terminal 20 to another transmission terminal 10 or mobile terminal 20 may be described as a "requestor terminal" and a terminal to which the request is sent as a destination may be described as a "destination terminal."

Further, in the transmission system 1, a session for management information to transmit or receive various types of management information via the transmission managing system 50 is established between the requestor terminal and the destination terminal. Further, a session to transmit or receive content data via the relay device 30 is established between the requestor terminal and the destination terminal. In addition, in the session to transmit or receive the content data, it is not always necessary to communicate via the relay device 30 but communication may be performed via the transmission managing system 50.

Further, the requestor terminal and the destination terminal may communicate with each other directly.

The relay device 30 relays content data among the transmission terminals 10 and the mobile terminals 20 as described above.

The transmission managing system 50 performs call control between the transmission terminals 10 or the mobile terminals 20. The transmission managing system 50 also performs log-in authentication of the transmission terminal 10 and the mobile terminal 20, manages a call status, manages a destination list, reports a destination of content data to the relay device 30, and causes the relay device 30 to manage the call status, for example.

While the transmission managing system 50 is an information processing apparatus, the transmission managing system 50 may also be a monitoring camera, industrial equipment having a communication function, a wearable PC, or the like. Further, the industrial equipment includes office equipment such as an MFP, medical equipment such as an endoscope, and agricultural equipment such as a cultivator. The wearable PC includes a wristwatch, a head-mounted display, and the like.

The program providing system 90 stores a program for a terminal in a Hard Disk (HD) 204 described later, the program causing the transmission terminal 10 or the mobile terminal 20 to implement various types of functions. The program providing system 90 can transmit the program for a terminal to the transmission terminal 10 and the mobile terminal 20. The program providing system 90 also stores a transmission managing program in a HD 304 described later, the program causing the transmission managing system 50 to implement various types of functions. The program providing system 90 can transmit the transmission managing program to the transmission managing system 50.

The transmission terminals (10*aa*, 10*ab*, 10*ac*, . . . ), the relay device 30*a*, and a router 70*a* are communicatively connected via a LAN 2*a*. The transmission terminals (10*ba*, 10*bb*, 10*bc*, . . . ), the mobile terminals (20*aa*, 20*ab*, . . . ), the relay device 30*b*, and a router 70*b* are communicatively connected via a LAN 2*b*. The LAN 2*a* and the LAN 2*b* are communicatively connected via a dedicated line 2*ab* in which a router 70*ab* is included. The LAN 2*a* and the LAN 2*b* are constructed within a predetermined region A. For example, the region A is Japan, the LAN 2*a* is constructed within an office in Tokyo and the LAN 2*b* is constructed within an office in Osaka. Further, the mobile terminals (20*aa*, 20*ab*, . . . ) are used in the region A.

Further, transmission terminals (10*ca*, 10*cb*, 10*cc*, . . . ), a relay device 30*c*, and a router 70*c* are communicatively connected via a LAN 2*c*. Transmission terminals (10*da*, 10*db*, 10*dc*, . . . ), mobile terminals (20*ac*, 20*ad*, . . . ), a relay device 30*d*, and a router 70*d* are communicatively connected via a LAN 2*d*. The LAN 2*c* and the LAN 2*d* are communicatively connected via a dedicated line 2*cd* in which a router 70*cd* is included. The LAN 2*c* and the LAN 2*d* are constructed within a predetermined region B. For example, the region B is the United States of America, the LAN 2*c* is constructed within an office in New York and the LAN 2*d* is constructed within an office in Washington D.C. Further, mobile terminals (20*ac*, 20*ad*, . . . ) are used in the region B.

The transmission managing system 50 and the program providing system 90 are communicatively connected to the transmission terminal 10, the mobile terminal 20, and the relay device 30 via the Internet 2*i*. The transmission managing system 50 and the program providing system 90 may be disposed in the region A, the region B, or another region.

Further, in FIG. 2, a set of four numbers beneath each transmission terminal 10, each mobile terminal 20, each relay device 30, the transmission managing system 50, each router 70, and the program providing system 90 indicates an IP address in IPv4 in a simplified manner.

<Hardware Configuration>
<<Transmission Terminal>>

In the following, a hardware configuration of the transmission terminal 10 is described with reference to FIG. 3. FIG. 3 is a hardware configuration diagram of the transmission terminal 10 according to this example. As illustrated in FIG. 3, the transmission terminal 10 according to this example includes a Central Processing Unit (CPU) 101 that controls the entire operation of the transmission terminal 10. Further, the transmission terminal 10 includes a Read Only Memory (ROM) 102 that stores a program such as an Initial Program Loader (IPL) used to drive the CPU 101 and includes a Random Access Memory (RAM) 103 used as a work area of the CPU 101. The transmission terminal 10 also includes a flash memory 104 that stores various types of data such as a terminal program 130, image data, and voice sound data. The transmission terminal 10 also includes a Solid State Drive (SSD) 105 that controls reading or writing of various types of data from or into the flash memory 104 in accordance with control of the CPU 101. Further, the transmission terminal 10 also includes a media drive 107 that controls reading or writing (storage) of data from or into a recording medium 106 such as a flash memory, and an operation button 108 to be operated to select a destination of the transmission terminal 10. The transmission terminal 10 also includes a power supply switch 109 for switching ON/OFF a power supply for the transmission terminal 10 and a network Interface (I/F) 111 for transmitting data via the communication network 2.

The transmission terminal 10 also includes a built-in camera 112 that takes a picture of an object in accordance with control of the CPU 101 in order to obtain image data, an imaging device I/F 113 that controls driving of the camera 112, and a built-in microphone 114 that inputs voice sound. Further, the transmission terminal 10 also includes a built-in loudspeaker 115 that outputs voice sound and a voice sound input/output I/F 116 that processes input and output of a voice sound signal between the microphone 114 and the loudspeaker 115 in accordance with control of the CPU 101. The transmission terminal 10 also includes a display I/F 117 that transmits image data to an external display 120 in accordance with control of the CPU 101 and an external device connection I/F 118 for connecting various types of external devices. Further, the transmission terminal 10 includes an authentication receiving I/F 119 and a bus line 110 such as an address bus or a data bus for electrically connecting each of the above constituent elements as illustrated in FIG. 3.

The display 120 may be a display device configured with liquid crystal or organic EL to display an image of an object, icons for operation, or the like. Further, the display 120 is connected to the display I/F 117 via a cable 120c. Although the display 120 of the transmission terminal 10 is connected to the display I/F 117 via the cable 120c, the display 120 is not limited to this and the display 120 may be built in the transmission terminal 10.

An external device such as an external camera, an external microphone, and an external loudspeaker may be connected to the external device connection I/F 118 via a Universal Serial Bus (USB) cable, for example.

The authentication receiving I/F 119 is an interface for receiving input of authentication information from a user. Specifically, the authentication receiving I/F 119 corresponds to an IC card reader (Near Field Communication (NFC), for example) or a reader for SD cards, SIM cards, or the like.

Further, a terminal program 130 may be recorded and distributed in a computer-readable recording medium such as the recording medium 106 with a file of an installable format or an executable format. Further, the terminal program 130 may be stored in the ROM 102 instead of the flash memory 104.

A hardware configuration of the mobile terminal 20 has many corresponding portions with respect to the hardware configuration of the transmission terminal 10. Even if there is a difference, it is assumed that the difference is not a hindrance to construction of the transmission system 1.

<<Transmission Managing System, Relay Device, Program Providing System>>

Figure 4:
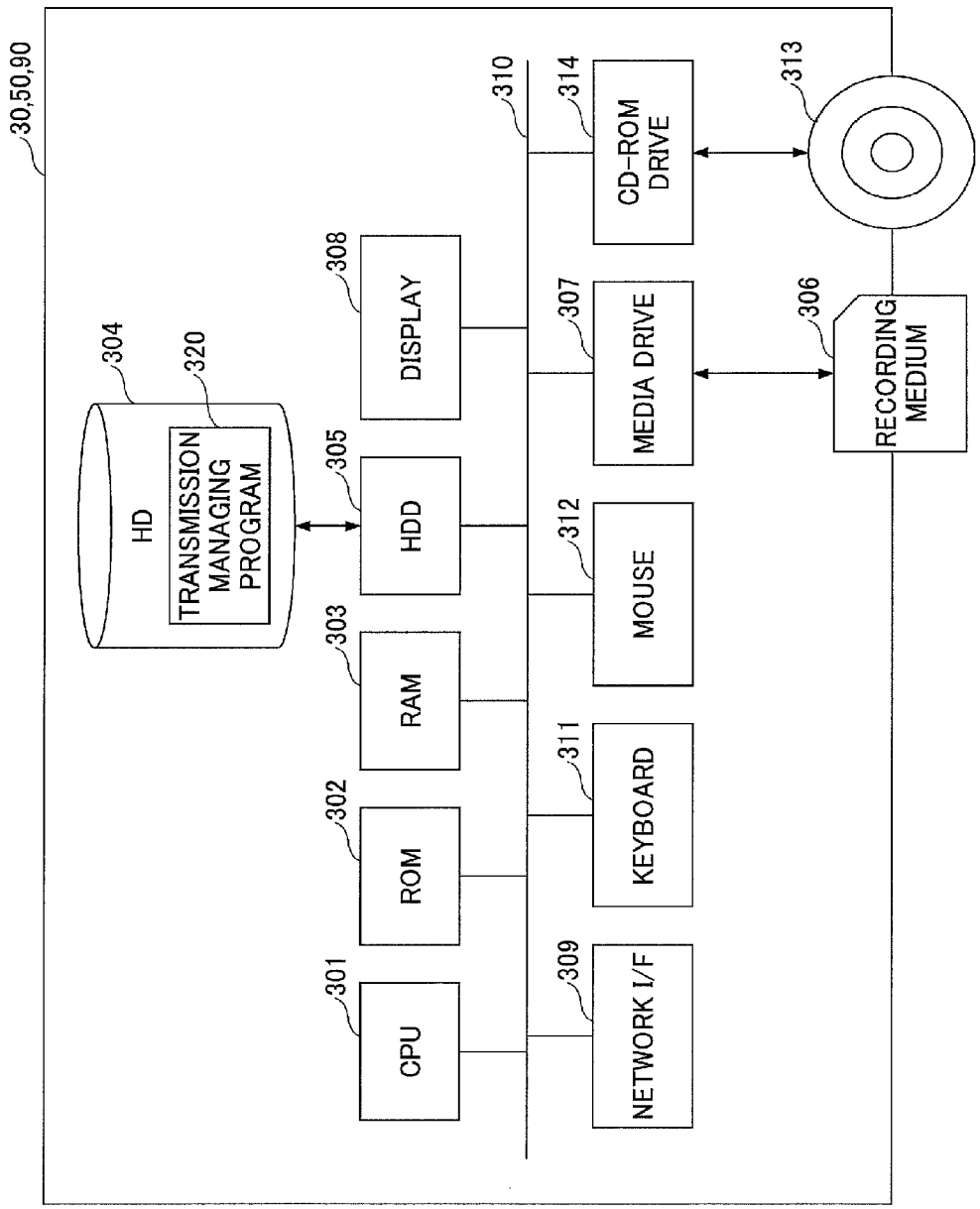
FIG. 4 is a hardware configuration diagram of a transmission management system according to an embodiment of the present invention.

In the following, a hardware configuration of the transmission managing system 50 is described with reference to FIG. 4. FIG. 4 is a hardware configuration diagram of the transmission managing system 50 according to this example.

In addition, the hardware configuration of the transmission managing system 50 and the like illustrated in the drawing does not need to be prepared as an integrated device housed in a single case. The hardware configuration indicates hardware elements preferably included in the transmission managing system 50 and the like. Further, in order to support cloud computing, the physical configuration of the transmission managing system 50 and the like of the example may not be fixed but the physical configuration may be determined by dynamically coupling or disconnecting hardware resources depending on load.

The transmission managing system 50 includes a CPU 301 that controls the entire operation of the transmission managing system 50, a ROM 302 that stores a program such as an IPL used to drive the CPU 301, and a RAM 303 used as a work area of the CPU 301. Further, the transmission managing system 50 also includes the HD 304 that stores various types of data such as a transmission managing program 320 and a Hard Disk Drive (HDD) 305 that controls reading or writing of various types of data from or into the HD 304 in accordance with control of the CPU 301. Further, the transmission managing system 50 also includes a media drive 307 that controls reading or writing (storage) of data from or into a recording medium 306 such as a flash memory and a display 308 that displays various types of information such as a cursor, a menu, a window, characters, or an image. Further, the transmission managing system 50 also includes a network I/F 309 for transmitting data via the communication network 2, a keyboard 311 having a plurality of keys for inputting characters, numerical values, and various types of instructions, and a mouse 312 for selecting and executing various types of instructions, selecting an object to be processed, and moving the cursor. Further, the transmission managing system 50 also includes a CD-ROM drive 314 that controls reading of various types of data from a Compact Disc Read Only Memory (CD-ROM) 313 as an example of a removable recording medium. The transmission managing system 50 also includes a bus line 310 such as an address bus or a data bus for electrically connecting each of the above constituent elements as illustrated in FIG. 4.

In addition, the transmission managing program 320 may be recorded and distributed in a computer-readable recording medium such as the recording medium 306 or the CD-ROM 313 with a file of an installable format or an executable format. Further, the transmission managing program 320 may be stored in the ROM 302 instead of the HD 304.

Because the relay device 30 and the program providing system 90 have the same hardware configuration as in the transmission managing system 50, a description of the hardware configuration is omitted.

<Functional Configuration>

Figure 5:
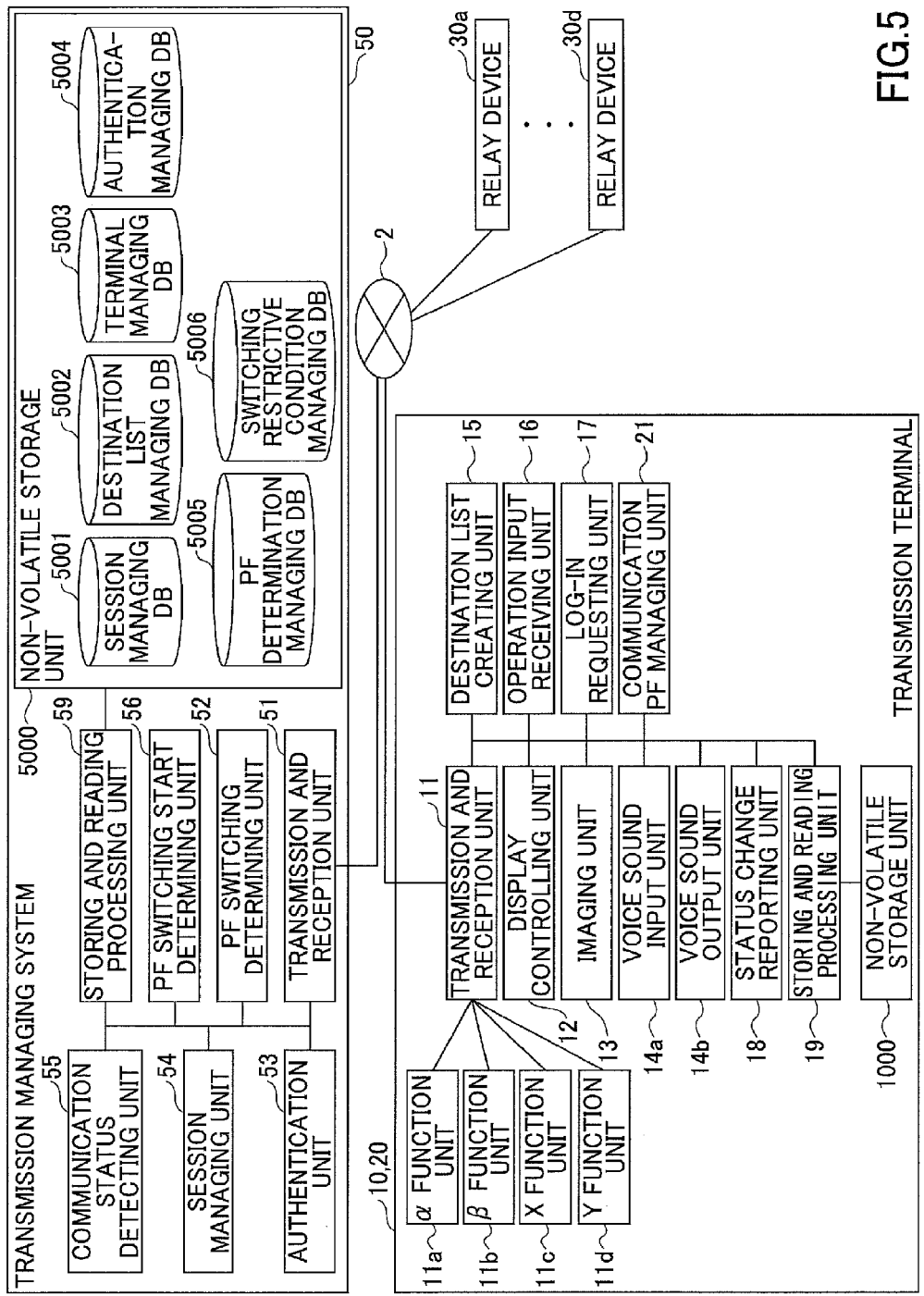
FIG. 5 is a functional block diagram of a transmission terminal and a transmission management system according to an embodiment of the present invention.

In the following, a functional configuration of the transmission terminal 10 and the transmission managing system 50 is described with reference to FIG. 5. FIG. 5 is a functional block diagram of the transmission terminal 10 and the transmission managing system 50. In addition, the program providing system 90 is omitted from FIG. 5 because the program providing system 90 is not directly related in the present example. Further, it is assumed that the mobile terminal 20 and the transmission terminal 10 have substantially the same functions and even if there is a difference, the difference is not a hindrance to implementation of the present example.

<<Each Functional Configuration of Transmission Terminal>>

The transmission terminal 10 includes a transmission and reception unit 11, a display controlling unit 12, an imaging unit 13, a voice sound input unit 14*a*, a voice sound output unit 14*b*, a destination list creating unit 15, an operation input receiving unit 16, a log-in requesting unit 17, a status change reporting unit 18, a communication PF managing unit 21, and a storing and reading processing unit 19.

Each unit included in the transmission terminal 10 is a function or a unit that functions when any one of the constituent elements depicted in FIG. 3 operates in response to an instruction from the CPU 101 in accordance with the terminal program 130 loaded in the RAM 103 from the flash memory 104.

Further, the transmission terminal 10 also includes a non-volatile storage unit 1000 constructed with the flash memory 104 depicted in FIG. 3.

The transmission and reception unit 11 of the transmission terminal 10 is implemented by an instruction from the CPU 101 depicted in FIG. 3 and the network I/F 111 depicted in FIG. 3. The transmission and reception unit 11 transmits and receives various types of data to and from another transmission terminal 10, the transmission managing system 50, the relay device 30, and the like via the communication network 2.

An α function unit 11*a*, a β function unit 11*b*, an X function unit 11*c*, and a Y function unit 11*d* are connected to the transmission and reception unit 11. The α function unit 11*a* performs a process necessary for a communication PF of α, and the β function unit 11*b* performs a process necessary for a communication PF of β. The communication PF of α is an example of a first communication platform and the communication PF of β is an example of a second communication platform.

The α function unit 11*a* performs communication with a destination having a global IP address and a port number used in WebRTC, for example. The β function unit 11*b* performs communication with a destination having an IP address (global IP address or private IP address) of the relay device 30. If communication protocols of the communication PF of α and the communication PF of β are different, the α function unit 11*a* performs communication in the communication protocol used for the communication PF of α and the β function unit 11*b* performs communication in the communication protocol used for the communication PF of β. Further, if video and audio compression methods of the communication PF of α and the communication PF of β are different, the α function unit 11*a* compresses or expands a video and audio in the compression method used for the communication PF of α and the β function unit 11*b* compresses or expands a video and audio in the compression method used for the communication PF of β. The same applies to the X function unit 11*c* and the Y function unit 11*d*. The X function unit 11*c* performs a process necessary for a communication PF of X and the Y function unit 11*d* performs a process necessary for a communication PF of Y.

The display controlling unit 12 is implemented by an instruction from the CPU 101 depicted in FIG. 3 and the display I/F 117 depicted in FIG. 3. The display controlling unit 12 performs control to transmit (output) image data to the external display 120.

The imaging unit 13 is implemented by an instruction from the CPU 101, the camera 112, and the imaging device I/F 113 depicted in FIG. 3. The imaging unit 13 takes a picture of an object and outputs image data obtained by taking the picture.

The voice sound input unit 14*a* is implemented by an instruction from the CPU 101 and the voice sound input/output I/F 116 depicted in FIG. 3. After voice sound of a user is converted into a voice sound signal by the microphone 114, the voice sound input unit 14*a* inputs voice sound data on the voice sound signal.

The voice sound output unit 14*b* is implemented by an instruction from the CPU 101 and the voice sound input/output I/F 116 depicted in FIG. 3. The voice sound output unit 14*b* outputs a voice sound signal related to voice sound data to the loudspeaker 115 and causes the loudspeaker 115 to output voice sound.

The destination list creating unit 15 is implemented by an instruction from the CPU 101 depicted in FIG. 3. The destination list creating unit 15 creates and updates a destination list based on destination status information (operation status of a transmission terminal 10 and a mobile terminal 20 that serve as a destination candidate terminal and a destination candidate) received from the transmission managing system 50.

The operation input receiving unit 16 is implemented by an instruction from the CPU 101, the operation button 108, and the power supply switch 109 depicted in FIG. 3. The operation input receiving unit 16 receives various types of input by the user. For example, if the user turns on the power supply switch 109 depicted in FIG. 3, the operation input receiving unit 16 receives the power-on and turns on the power supply.

The log-in requesting unit 17 is implemented by an instruction from the CPU 101 depicted in FIG. 3. The log-in requesting unit 17 operates in response to the reception of the above power-on (or in response to an authentication operation by the user). In other words, the log-in requesting unit 17 automatically transmits log-in request information to request a log-in and an IP address of a requestor terminal at this moment from the transmission and reception unit 11 to the transmission managing system 50 via the communication network 2.

The status change reporting unit 18 is implemented by an instruction from the CPU 101 depicted in FIG. 3 and the network I/F 111 depicted in FIG. 3. The status change reporting unit 18 reports a change of a communication status such as a change of a communication band to the transmission managing system 50.

The communication PF managing unit 21 is implemented by an instruction or the like from the CPU 101 depicted in FIG. 3. The communication PF managing unit 21 manages a communication PF to be used by the transmission terminal 10 in response to an instruction from the transmission managing system 50.

The storing and reading processing unit 19 is implemented by an instruction from the CPU 101 depicted in FIG. 3 and the SSD 105 depicted in FIG. 3. The storing and reading processing unit 19 performs a process to store various types of data in the non-volatile storage unit 1000 or read various types of data stored in the non-volatile storage unit 1000. This non-volatile storage unit 1000 stores communication Identification (ID) to identify the transmission terminal 10 as a communication destination or a user thereof, type identification information (indicating distinction between the transmission terminal 10 and the mobile terminal 20), a password, and the like. In addition, the communication ID and the password may not be stored in the non-volatile storage unit 1000 and the user may input the communication ID and the password each time a log-in request is sent to the transmission managing system 50, for example.

<<Functional Configuration of Transmission Managing System>>

The transmission managing system 50 includes a transmission and reception unit 51, a PF switching determining unit 52, an authentication unit 53, a session managing unit 54, a communication status detecting unit 55, a PF switching start determining unit 56, and a storing and reading processing unit 59. Each of these units is a function or a unit that functions implemented when any one of the constituent elements depicted in FIG. 4 operates in response to an instruction from the CPU 301 in accordance with the transmission managing program 320 loaded in the RAM 303 from the HD 304. Further, the transmission managing system 50 also includes a non-volatile storage unit 5000 that maintains memory of various types of data even if the transmission managing system 50 is powered off. The non-volatile storage unit 5000 is constructed with the HD 304 depicted in FIG. 4.

In the following, each database (DB) stored in the non-volatile storage unit 5000 is described. In addition, a switching restrictive condition managing DB 5006 is described later.

TABLE 1

| Session ID | Transmission Terminal | Communication Platform |
|---|---|---|
| (a) (Session managing table) | | |
| Se_001 | 01aa, 01ab | X |
| Se_002 | 01ca, 02ab, 02ad | Y |
| ... | ... | ... |
| (b) (Session managing table) | | |
| Se_001 | 01aa, 01ab | X |
| Se_002 | 01ca, 02ab, 02ad | Y |
| Se_003 | 01aa, 01ab | Y |
| ... | ... | ... |

In the non-volatile storage unit 5000, a session managing DB 5001 configured with the session managing tables as indicated in Table 1 is constructed. In the session managing tables, terminal IDs of transmission terminals 10 participating in the same session and a communication PF are managed in association with each session ID that identifies a session.

The session managing table in Table 1-(a) indicates a session managing table before switching of the communication PF and the session managing table in Table 1-(b) indicates a session managing table after switching of the communication PF. As will be described in detail below, a communication PF of X with a session ID="Se_001" in Table 1-(a) is registered as a session with a session ID="Se_003" in Table 1-(b) and the communication PF is switched from X to Y.

TABLE 2

(Destination list managing table)

| Communication ID | Communication ID of destination candidate |
|---|---|
| 01aa | 01ab, 01ac, 02ab, 02ac, 02ad |
| 01ab | 01aa, 01ac, 02ab, 02ac, 02ad |
| 01ac | 01aa, 01ab, 02ab, 02ac, 02ad |
| 02ab | 01aa, 01ab, 01ac, 02ac, 02ad |
| 02ac | 01aa, 01ab, 01ac, 02ab, 02ad |
| 02ad | 01aa, 01ab, 01ac, 02ab, 02ac |

In the non-volatile storage unit 5000, a destination list managing DB 5002 configured with the destination list managing table for managing destination information as indicated in Table 2 is constructed. In the destination list managing table, communication IDs of transmission terminals 10 or mobile terminals 20 of all destination candidates are managed in association with a communication ID of a requestor terminal that sends a request for starting connection (calling) in a video conference. The communication IDs of the destination candidates correspond to transmission terminals 10 or mobile terminals 20 with which the requestor terminal can start communication.

TABLE 3

(Terminal managing table)

| Communication ID | Operation status | Name | IP address |
|---|---|---|---|
| 01aa | Online | Head office | 1.2.1.3 |
| 01ab | Online | Tokyo office | 1.2.1.4 |
| 01ac | Offline | Osaka office | 1.2.1.5 |
| 02ab | Online | YAMADA Taro | 1.4.1.2 |
| 02ac | Online | SATO Jiro | 1.5.1.1 |
| 02ad | Offline | Ito Saburo | 1.5.1.2 |

In the non-volatile storage unit 5000, a terminal managing DB 5003 configured with the terminal managing table as indicated in Table 3 is constructed. In the terminal managing table, an operation status of each transmission terminal, a name when each communication ID represents a destination, and an IP address of the terminal are managed in association with each communication ID of the transmission terminal 10.

TABLE 4

(Authentication managing table)

| Communication ID | Password |
|---|---|
| 01aa | aaaa |
| 01ab | abab |
| 01ac | acac |
| 02ab | ABAB |
| 02ac | ACAC |
| 02ad | ADAD |

In the non-volatile storage unit 5000, an authentication managing DB 5004 configured with the authentication managing table as indicated in Table 4 is constructed. In the authentication managing table, a password of each transmission terminal 10 or user is managed in association with a communication ID of the transmission terminal 10 or the user.

TABLE 5

(a) (PF determining table)

| Communication band | Communication platform |
|---|---|
| There is at least one communication terminal with communication band of 1 Mbps or less | X (WebRTC, low quality) |
| Others | Y (WebRTC, high quality) |

(b) (PF determining table)

| Number of locations | Communication platform |
|---|---|
| Two | α (WebRTC) |
| three or more | β (via relay device) |

In the non-volatile storage unit 5000, a PF determination managing DB 5005 configured with the PF determining table as indicated in Table 5-(a) is constructed. In the PF determining table indicated in Table 5-(a), communication PFs are managed in association with whether there is at least one communication terminal 10 whose communication band has a given value (1 Mbps, for example) or less. The communication PF of X means a communication PF having a high compression ratio for video and audio, for example, while WebRTC is used. The communication PF of Y means a communication PF having a relatively low compression ratio for video and audio.

Further, there are various types of PF determining tables. One example is the PF determining table indicated in Table 5-(b), in which communication PFs are managed in association with the number of locations. The communication PF of α means communication using WebRTC, for example, and the communication PF of β means communication via the relay device 30.

<<Each Functional Configuration of Transmission Managing System>>

In the following, each functional configuration of the transmission managing system 50 is described in detail. The transmission and reception unit 51 is implemented by an instruction from the CPU 301 depicted in FIG. 4 and the network I/F 309 depicted in FIG. 4. The transmission and reception unit 51 transmits and receives various types of data to and from the transmission terminal 10 and the relay device 30 via the communication network 2.

The authentication unit 53 is implemented by an instruction or the like from the CPU 301 depicted in FIG. 4. The authentication unit 53 authenticates the transmission terminal 10 or the user depending on whether a combination of a communication ID and a password included in log-in request information received via the transmission and reception unit 51 matches one of sets registered in the authentication managing DB 5004. In addition, an authentication method is not limited to this and a client certificate (authentication method that uses a public key and a private key) may be used.

The session managing unit 54 is implemented by an instruction from the CPU 301 depicted in FIG. 4. When connection to a destination terminal is requested (when start requesting information is obtained) from the transmission terminal 10 authenticated by the authentication unit 53, the session managing unit 54 stores and manages a session ID, communication IDs of the transmission terminals 10 participating in a session (the communication ID of the requestor terminal and the communication ID of the destination terminal), and a communication PF in the session managing DB 5001 in an associated manner. The session managing unit 54 establishes a suitable session for each communication PF.

The communication status detecting unit 55 is implemented by an instruction from the CPU 301 depicted in FIG. 4. The communication status detecting unit 55 detects a communication status between the transmission terminals 10 and a communication status between the transmission terminal 10 and the transmission managing system 50. One example of the communication status in this example is a communication band and the number of locations. In other words, the status change reporting unit 18 of the transmission terminal 10 may report a change of the communication status or the communication status detecting unit 55 of the transmission managing system 50 may detect a change of the communication status.

The PF switching determining unit 52 is implemented by an instruction from the CPU 301 depicted in FIG. 4. The PF switching determining unit 52 refers to the PF determining table depending on the communication status and selects (determines) a suitable communication PF. The determination of the communication PF and determination of whether to switch are described in detail later. If the PF switching determining unit 52 determines switching of the communication PF, the PF switching determining unit 52 reports a communication PF to be used after switching to the session managing unit 54 and requests establishment of a session.

The PF switching start determining unit 56 is implemented by an instruction from the CPU 301 depicted in FIG. 4. The PF switching start determining unit 56 determines whether to cause the transmission terminal 10 to start switching of the communication PF. If the PF switching start determining unit 56 confirms that all of the transmission terminals 10 are prepared for switching of the communication PF, the PF switching start determining unit 56 causes the transmission terminals 10 to start switching of the communication PF.

The storing and reading processing unit 59 is implemented by an instruction from the CPU 301 depicted in FIG. 4 and the HDD 305 depicted in FIG. 4. The storing and reading processing unit 59 performs a process to store various types of data in the non-volatile storage unit 5000 and read various types of data stored in the non-volatile storage unit 5000.

<Operation Procedure from Establishment of Session to Switching of Communication PF>

<<If the Number of Transmission Terminals 10 is Two>>

Figure 6:
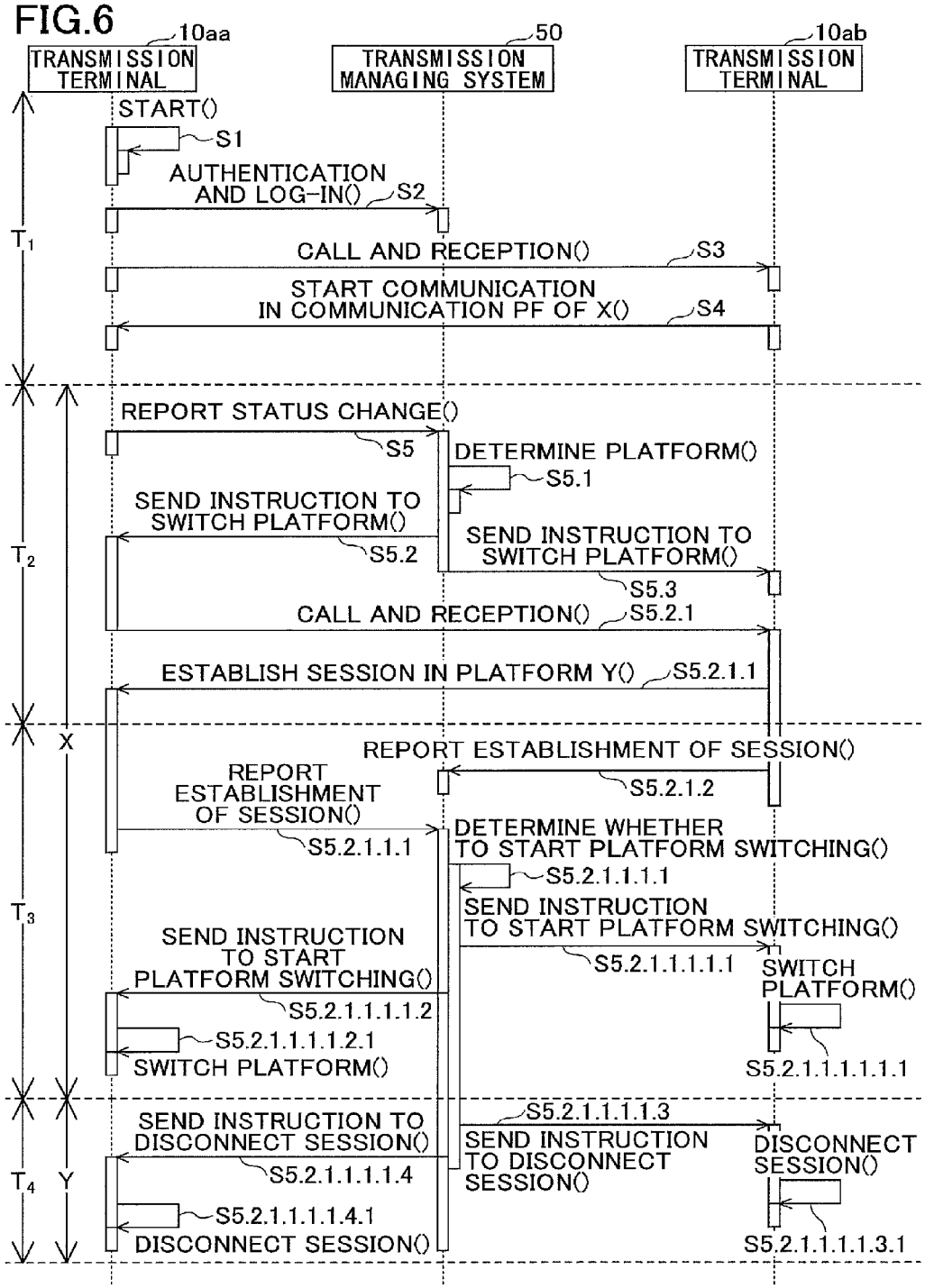
FIG. 6 is a sequence diagram depicting a transmission system switching from a communication PF of X to a communication PF of Y according to an embodiment of the present invention.

First, a procedure by which the transmission system 1 switches a communication PF while the number of the transmission terminals 10 is two is described with reference to FIG. 6. FIG. 6 is a sequence diagram depicting the transmission system 1 switching from the communication PF of X to the communication PF of Y.

S1: When the user turns on the power supply switch 109, the operation input receiving unit 16 receives the power-on and starts the transmission terminal 10aa.

S2: In response to the power-on, the log-in requesting unit 17 automatically transmits log-in request information indicating a log-in request to the transmission managing system 50 via the transmission and reception unit 11. The log-in request may be transmitted at any time by a user operation other than the power-on. The log-in request information includes a password and a communication ID for identifying the transmission terminal 10aa as a requestor terminal.

In addition, because the transmission terminal 10ab has logged into the transmission managing system 50 in the same manner, the transmission managing system 50 detects IP addresses, port numbers, and the like of the transmission terminals 10aa and 10ab. When the transmission managing system 50 reports each of the IP addresses, port numbers, and the like to the corresponding transmission terminals 10aa and 10ab, the transmission terminals 10aa and 10ab can perform communication. The transmission managing system 50 sends an instruction to communicate in the communication PF of X to the transmission terminals 10aa and 10ab. The communication PF managing unit 21 of the transmission terminals 10aa and 10ab detects that communication is to be performed in the communication PF of X.

S3: The transmission and reception unit 11 of the transmission terminal 10aa calls the transmission terminal 10ab. The transmission and reception unit 11 of the transmission terminal 10ab receives this call and sounds a ringtone.

S4: When the user of the transmission terminal 10ab performs an off-hook operation, the operation input receiving unit 16 receives the operation and communication becomes possible in the communication PF of X between the transmission terminals 10aa and 10ab. In other words, a session of the communication PF of X is established between the transmission terminals 10aa and 10ab. The transmission terminals 10aa and 10ab use the communication PF of X to perform communication (transmission and reception of content data CD).

It is assumed that a status change that can be an opportunity to switch a communication PF occurs while the session of the communication PF of X is established (while communication is maintained). For example, it is assumed that a communication band exceeds 1 Mbps.

S5: When the communication status changes, the status change reporting unit 18 of the transmission terminal 10aa transmits a status change report to the transmission managing system 50. The communication status detecting unit 55 of the transmission managing system 50 obtains the status change report. In this example, it is assumed that a change of the communication band is detected and the changed communication band is included in the status change report.

S5.1: When the status change report is obtained, the PF switching determining unit 52 of the transmission managing system 50 determines whether to switch a communication PF. In other words, the PF switching determining unit 52 refers to the PF determining table and determines a communication PF based on the communication band of the transmission terminal 10aa. In this case, it is assumed that because the communication band of the transmission terminal 10aa exceeds 1 Mbps, the PF switching determining unit 52 determines that it is necessary to switch to the communication PF of Y.

S5.2: The PF switching determining unit 52 of the transmission managing system 50 sends an instruction to switch to the communication PF of Y to the transmission terminal 10aa.

S5.3: The PF switching determining unit 52 of the transmission managing system 50 sends an instruction to switch to the communication PF of Y to the transmission terminal 10ab.

S5.2.1: The transmission and reception unit 11 of the transmission terminal 10aa calls the transmission terminal 10ab. The transmission and reception unit 11 of the transmission terminal 10ab receives this call and sounds a ringtone.

S5.2.1.1: When the user of the transmission terminal 10ab performs an off-hook operation, the operation input receiving unit 16 receives the operation and a session of the communication PF of Y is established between the transmission terminals 10aa and 10ab. In other words, communication becomes possible in the communication PF of Y between the transmission terminals 10aa and 10ab. In this state, the transmission terminals 10aa and 10ab do not perform communication yet in the communication PF of Y.

In this manner, while communication is performed in the communication PF of X, the transmission managing system 50 establishes the session in the communication PF of Y to be used after switching. In addition, the session managing unit 54 of the transmission managing system 50 registers a session ID, a communication ID of the transmission terminal 10, and the communication PF related to the communication PF of Y in the session managing table (Table 1-(b)).

S5.2.1.2: The transmission terminal 10ab that established the session of the communication PF of Y transmits a session establishment report to the transmission managing system 50 in order to report that preparation for switching of the communication PF is completed.

S5.2.1.1.1: The transmission terminal 10aa that established the session of the communication PF of Y transmits a session establishment report to the transmission managing system 50.

S5.2.1.1.1.1: The PF switching start determining unit 56 of the transmission managing system 50 determines whether to start switching of the communication PF. A criterion for the determination is whether the session of the communication PF of Y is established (whether the session establishment report is received from both of the transmission terminals 10aa and 10ab). The session managing table in Table 1-(b) is used to determine whether the session establishment report is received from all of the transmission terminals 10. In accordance with this, whether the session establishment report is received from all of the transmission terminals 10 is determined, the transmission terminals 10 being registered for the communication PF of Y established anew.

S5.2.1.1.1.1.1: If it is confirmed that the session establishment report is received from all of the transmission terminals 10, the PF switching start determining unit 56 of the transmission managing system 50 sends, to the transmission terminal 10ab, an instruction to start PF switching. The instruction to start PF switching is an instruction to perform switching to a new communication PF.

S5.2.1.1.1.1.2: The PF switching start determining unit 56 of the transmission managing system 50 sends, to the transmission terminal 10aa, an instruction to start PF switching.

In accordance with this, the communication PF managing unit 21 of the transmission terminals 10aa and 10ab detects that communication is to be performed in the communication PF of Y. The switching of the communication PF is performed accordingly. In addition, the instruction to start PF switching is sent to all of transmission terminals 10 registered for the communication PF of Y established anew in the session managing table.

S5.2.1.1.1.1.1.1: The communication PF managing unit 21 of the transmission terminal 10ab that has received the instruction to start PF switching switches the communication PF. In other words, the transmission terminal 10ab ends communication performed by the transmission and reception unit 11 and the X function unit 11c and starts communication performed by the transmission and reception unit 11 and the Y function unit 11d.

S5.2.1.1.1.1.2.1: The communication PF managing unit 21 of the transmission terminal 10aa that has received the instruction to start PF switching switches the communication PF. In other words, the transmission terminal 10aa ends communication performed by the transmission and reception unit 11 and the X function unit 11c and starts communication performed by the transmission and reception unit 11 and the Y function unit 11d.

In this manner, the transmission terminals 10aa and 10ab start communication in the communication PF of Y.

S5.2.1.1.1.1.3: Then, the PF switching start determining unit 56 of the transmission managing system 50 disconnects the session of the communication PF of X used before the switching. In order to do this, the PF switching start determining unit 56 sends an instruction to disconnect the session to the transmission terminal 10ab.

S5.2.1.1.1.1.4: The PF switching start determining unit 56 of the transmission managing system 50 sends an instruction to disconnect the session to the transmission terminal 10aa.

S5.2.1.1.1.1.3.1: The communication PF managing unit 21 of the transmission terminal 10ab disconnects the session of the communication PF of X.

S5.2.1.1.1.1.4.1: The communication PF managing unit 21 of the transmission terminal 10aa disconnects the session of the communication PF of X. In addition, the disconnection of the session refers to ending of all communication including periodic alive monitoring to be performed regardless of transmission or reception of content data CD, for example. Further, information necessary for communication such as an IP address and a port number of a communication partner will also be discarded.

In this manner, in the transmission system 1 of the example in FIG. 6, while content data CD is transmitted and received in the communication PF of X in an interval T3, a session of the communication PF of Y to be used after switching is established in the interval T3. In this state, communication is started in the communication PF of Y (the communication PF is switched) in the interval T3, and the session of the communication PF of X is disconnected in an interval T4 after the switching of the communication PF. Accordingly, it is possible to prevent discontinuation of voice sound and an image when the communication PF is switched.

Further, if the session establishment report is transmitted from all of the transmission terminals 10, switching of the communication PF is started, so that if all of the transmission terminals 10 are prepared for communication in a new communication PF, switching to the new communication PF is performed. Accordingly, it is possible to prevent discontinuation of voice sound and an image in all of the transmission terminals 10.

The communication PFs used for transmission and reception of the content data CD are switched in step S5.2.1.1.1.1.1.1 and step S5.2.1.1.1.1.2.1, so that the same voice sound and image will not be transmitted repeatedly.

<<If the Number of Transmission Terminals 10 is Increased from Two to Three>>

In the following, a case where the number of the transmission terminals 10 is increased from two to three is described. First, session managing tables used in this example are described.

TABLE 6

| Session ID | Transmission Terminal | Communication Platform |
|---|---|---|
| (a) (Session managing table) | | |
| Se_001 | 01aa, 01ab | α |
| Se_002 | 01ca, 02ab, 02ad | Y |
| ... | ... | ... |
| (b) (Session managing table) | | |
| Se_001 | 01aa, 01ab | α |
| Se_002 | 01ca, 02ab, 02ad | Y |
| Se_003 | 01aa, 01ab, 01ac | β |
| ... | ... | ... |

In the same manner as in Table 1, the session managing table in Table 6-(a) indicates a session managing table before switching of the communication PF and the session managing table in Table 6-(b) indicates a session managing table after switching of the communication PF. A communication PF of α with a session ID="Se_001" in Table 6-(a) is registered as a session with a session ID="Se_003" in Table 6-(b). In Table 6-(b), the number of transmission terminals 10 is increased to three and the communication PF is switched to β.

Figure 7:
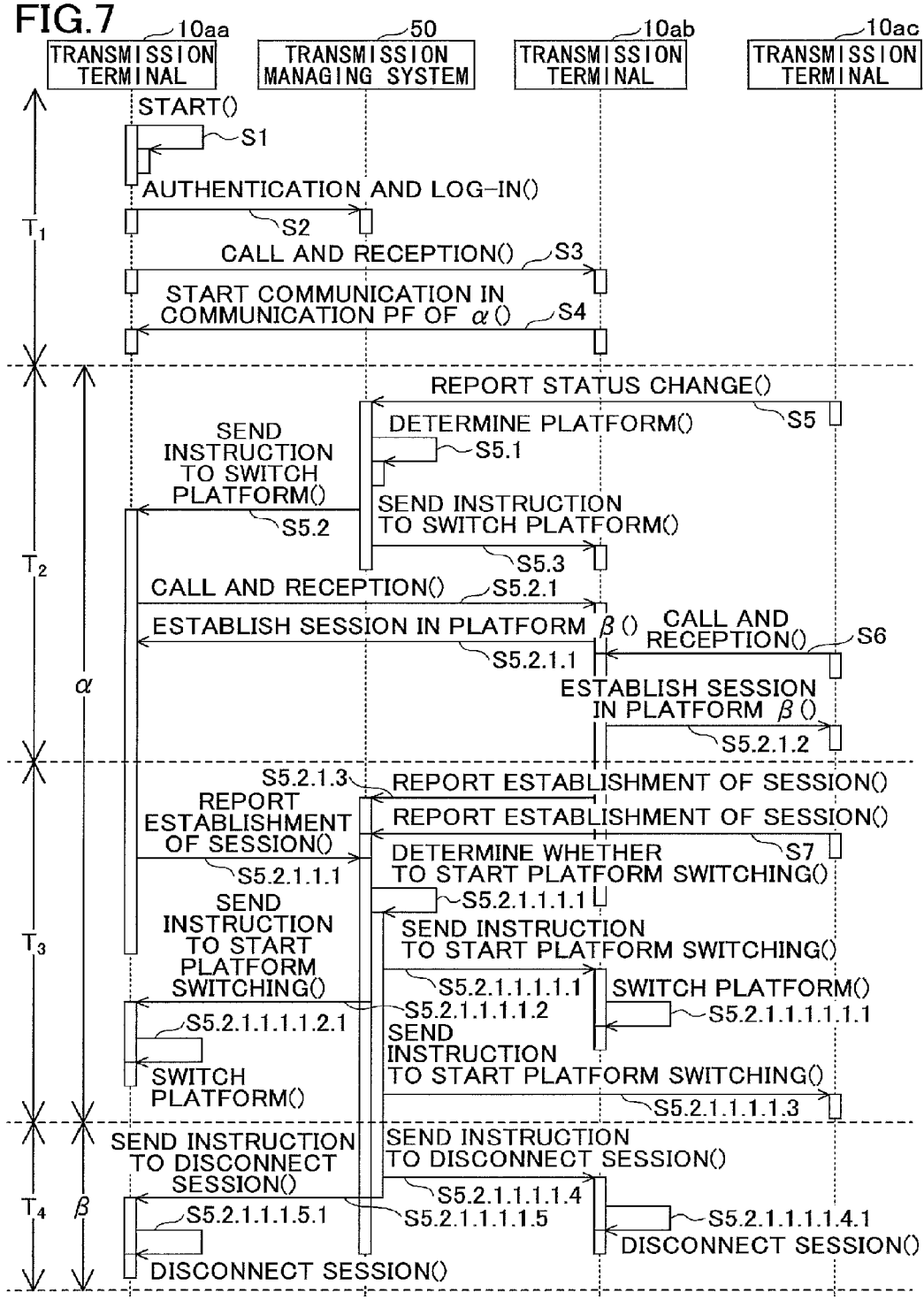
FIG. 7 is a sequence diagram depicting a transmission system switching from a communication PF of a to a communication PF of β if the number of transmission terminals is increased from two to three according to an embodiment of the present invention.

FIG. 7 is a sequence diagram depicting the transmission system 1 switching from the communication PF of α to the communication PF of β if the number of the transmission terminals 10 is increased from two to three.

S1 to S4: The same as in FIG. 6. In accordance with this, communication is performed in the communication PF of α between the transmission terminals 10aa and 10ab.

S5: Then the transmission and the reception unit 11 of a transmission terminal 10ac transmits a request for starting communication with the transmission terminal 10aa or the transmission terminal 10ab to the transmission managing system 50. The transmission managing system 50 obtains the request as a status change report.

S5.1: When the status change report is obtained, the PF switching determining unit 52 of the transmission managing system 50 determines whether to switch a communication PF. In other words, the PF switching determining unit 52 refers to the PF determining table and determines a communication PF based on the number of transmission terminals 10 that participate in a session. In this case, it is assumed that because the number of transmission terminals 10 that participate in the session is increased to three, the PF switching determining unit 52 determines switching to the communication PF of β (Table 5-(b)).

S5.2: The PF switching determining unit 52 of the transmission managing system 50 sends an instruction to switch to the communication PF of β to the transmission terminal 10aa.

S5.3: The PF switching determining unit 52 of the transmission managing system 50 sends an instruction to switch to the communication PF of β to the transmission terminal 10ab.

The transmission terminal 10ac obtains information (an IP address, a port number, and the like) for communicating with the transmission terminal 10ab in the communication PF of β from the transmission managing system 50.

S5.2.1: The transmission and reception unit 11 of the transmission terminal 10aa calls the transmission terminal 10ab. The transmission and reception unit 11 of the transmission terminal 10ab receives this call and sounds a ringtone.

S5.2.1.1: When the user of the transmission terminal 10ab performs an off-hook operation, the operation input receiving unit 16 receives the operation and a session of the communication PF of β is established between the transmission terminals 10aa and 10ab.

S6: The transmission and reception unit 11 of the transmission terminal 10ac calls the transmission terminal 10ab. The transmission and reception unit 11 of the transmission terminal 10ab receives this call and sounds a ringtone.

S5.2.1.2: When the user of the transmission terminal 10ab performs an off-hook operation, the operation input receiving unit 16 receives the operation and a session of the communication PF of β is established between the transmission terminals 10ac and 10ab.

In this manner, while the communication PF of α is established, the transmission terminals 10aa and 10ab and the transmission terminals 10ac and 10ab establish the sessions of the communication PF of β to be used after switching. In addition, the session managing unit 54 of the transmission managing system 50 registers a session ID, a communication ID of the transmission terminal 10, and the communication PF related to the communication PF of established anew in the session managing table (Table 6-(b)).

S5.2.1.3: The transmission terminal 10ab that established the session of the communication PF of β transmits a session establishment report to the transmission managing system 50 in order to report that preparation for switching of the communication PF is completed.

S7: The transmission terminal 10ac that established the session of the communication PF of β transmits a session establishment report to the transmission managing system 50 in order to report that preparation for switching of the communication PF is completed.

S5.2.1.1.1: The transmission terminal 10aa that established the session of the communication PF of β transmits a session establishment report to the transmission managing system 50 in order to report that preparation for switching of the communication PF is completed.

S5.2.1.1.1.1: The PF switching start determining unit 56 of the transmission managing system 50 determines whether to start switching of the communication PF. A criterion for the determination is the same as in FIG. 6.

S5.2.1.1.1.1.1: If it is confirmed that the session establishment report is received from all of the transmission terminals 10, the PF switching start determining unit 56 of the transmission managing system 50 sends, to the transmission terminal 10ab, an instruction to start PF switching. In accordance with this, the communication PF managing unit 21 of the transmission terminal 10ab detects that communication is to be performed in the communication PF of β.

S5.2.1.1.1.1.2: The PF switching start determining unit 56 of the transmission managing system 50 sends, to the transmission terminal 10aa, an instruction to start PF switching. In accordance with this, the communication PF managing unit 21 of the transmission terminal 10aa detects that communication is to be performed in the communication PF of β.

S5.2.1.1.1.1.1.1: The communication PF managing unit 21 of the transmission terminal 10ab that has received the instruction to start PF switching switches the communication PF. In other words, the transmission terminal 10ab starts communication performed by the transmission and reception unit 11 and the β function unit 11b.

S5.2.1.1.1.1.2.1: The communication PF managing unit 21 of the transmission terminal 10aa that has received the instruction to start PF switching switches the communication PF. In other words, the transmission terminal 10aa starts communication performed by the transmission and reception unit 11 and the β function unit 11b.

S5.2.1.1.1.1.3: The PF switching start determining unit 56 of the transmission managing system 50 sends, to the transmission terminal 10ac, an instruction to start PF switching. In accordance with this, the communication PF managing unit 21 of the transmission terminal 10ac detects that communication is to be performed in the communication PF of β.

In this manner, the transmission terminals 10aa, 10ab, and 10ac can start communication in the communication PF of β.

S5.2.1.1.1.1.4: Then, the PF switching start determining unit 56 of the transmission managing system 50 disconnects the session of the communication PF of α used before the switching. In order to do this, the PF switching start determining unit 56 sends an instruction to disconnect the session to the transmission terminal 10ab.

S5.2.1.1.1.1.5: The PF switching start determining unit 56 of the transmission managing system 50 sends an instruction to disconnect the session to the transmission terminal 10aa.

S5.2.1.1.1.1.4.1: The communication PF managing unit 21 of the transmission terminal 10ab disconnects the session of the communication PF of α.

S5.2.1.1.1.1.5.1: The communication PF managing unit 21 of the transmission terminal 10aa disconnects the session of the communication PF of α.

In this manner, even if the number of the transmission terminals 10 that participate in the session is increased, it is possible to prevent discontinuation of communication accompanied by switching of the communication PF.

<<Determination of Switching of Communication PF>>

Figure 8:
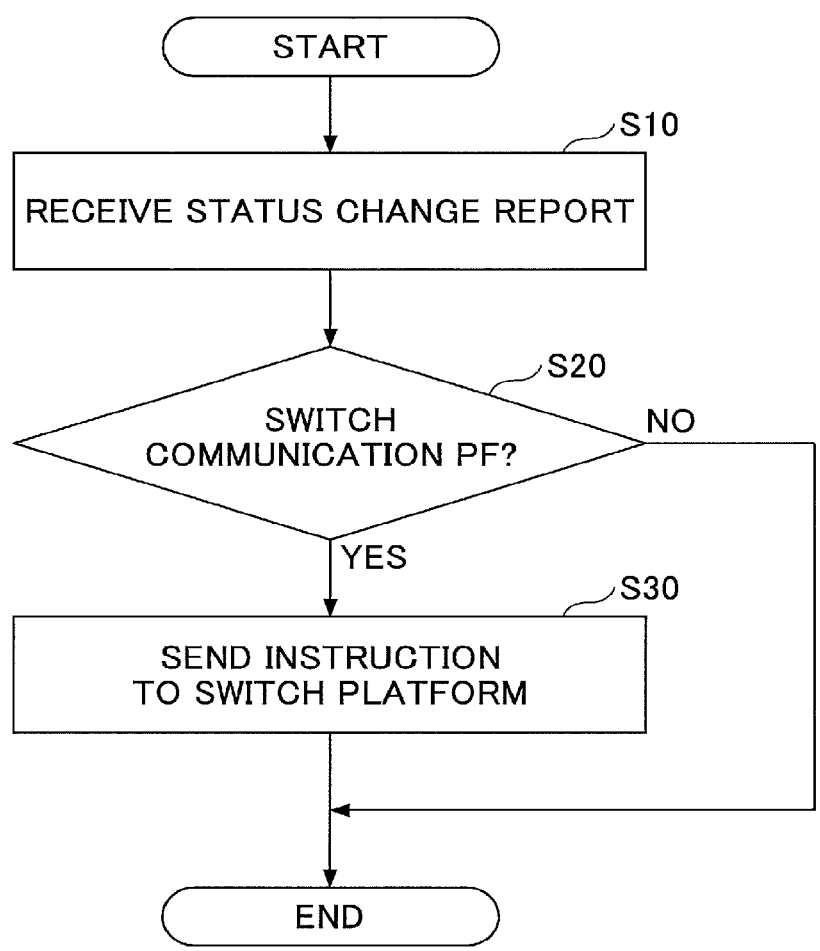
FIG. 8 is a flowchart illustrating a process by which a PF switching determining unit determines whether to switch a communication PF according to an embodiment of the present invention.

FIG. 8 is a flowchart illustrating a process by which the PF switching determining unit 52 determines whether to switch a communication PF.

First, the transmission and reception unit 51 of the transmission managing system 50 receives a status change report from the transmission terminal 10 (S10). While the transmission terminal 10 that transmits the status change report is usually registered in the terminal managing table, the transmission terminal 10 is not limited to this. The status change report includes information for performing determination based on the PF determining table. In other words, the information is about the above communication band or the number of the transmission terminals 10 that participate in a session. Further, the communication status detecting unit 55 of the transmission managing system 50 may detect a change of a communication status.

Then, the PF switching determining unit 52 of the transmission managing system 50 refers to the PF determining table to determine whether to switch the communication PF (S20).

If a result of the determination in step S20 is Yes, the PF switching determining unit 52 sends an instruction to perform PF switching to the transmission terminal 10 (S30).

If a result of the determination in step S20 is No, the PF switching determining unit 52 does not change the communication PF, so that the current communication PF is maintained.

<<Determination of Whether to Start Switching of Communication PF>>

Figure 9:
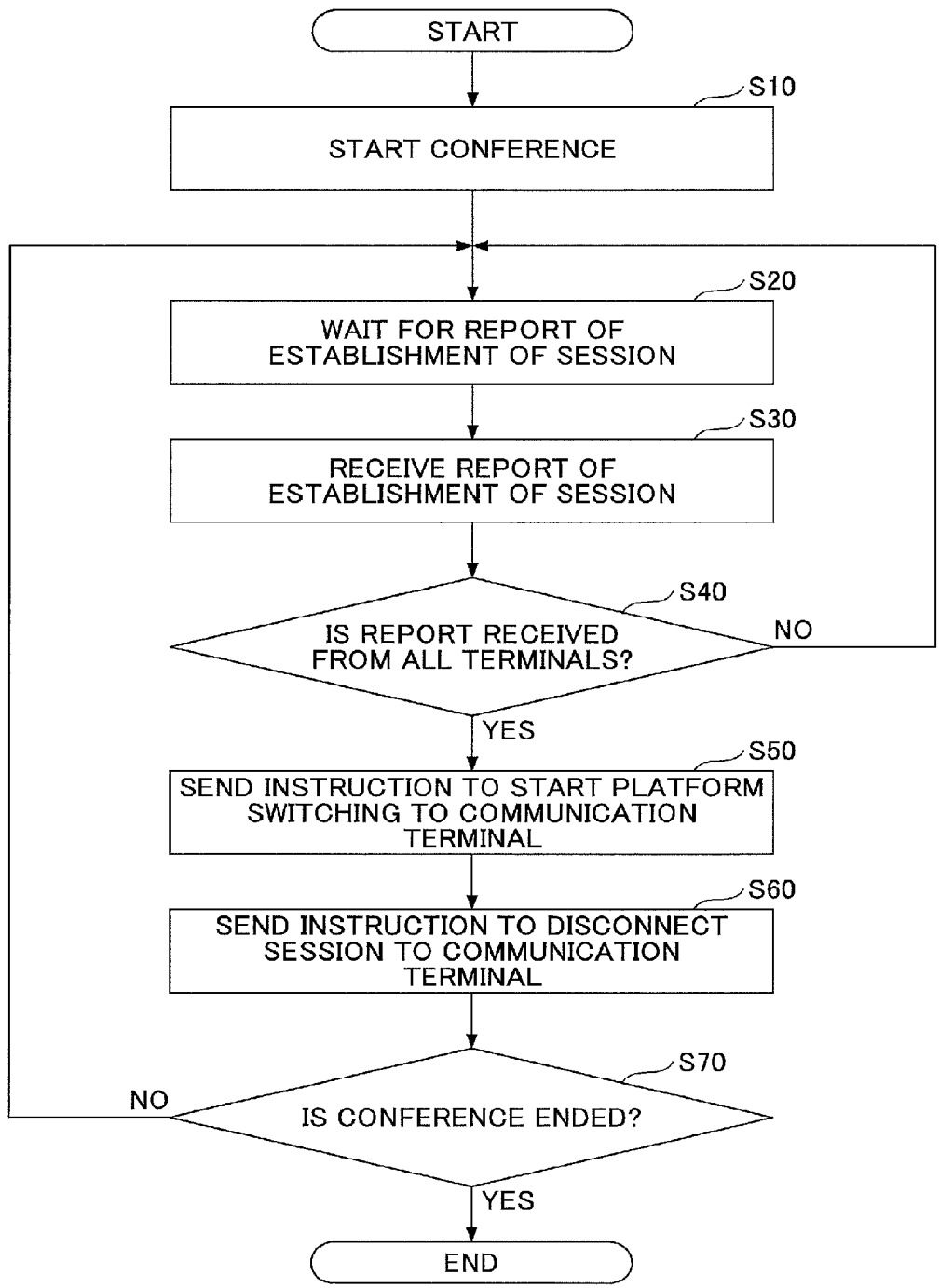
FIG. 9 is a flowchart illustrating a process by which a PF switching start determining unit determines whether to start switching of a communication PF according to an embodiment of the present invention.

FIG. 9 is a flowchart illustrating a process by which the PF switching start determining unit 56 determines whether to start switching of the communication PF. The flowchart in FIG. 9 illustrates a process of step S5.2.1.1.1.1 in FIGS. 6 and 7 in detail.

A session is established and a plurality of transmission terminals 10 perform communication (conference) (S10).

In this state, the PF switching start determining unit 56 of the transmission managing system 50 waits for a session establishment report (S20).

Then, the session establishment report is received from each transmission terminal 10 to which the establishment of the session is requested (S30).

When the session establishment report is received, the PF switching start determining unit 56 determines whether the session establishment report is received from all of the transmission terminals 10 that participate in the same session (S40). In other words, the PF switching start determining unit 56 determines whether the session establishment report is received from all of the transmission terminals 10 associated with a communication PF (a record of Se_001 in Table 1-(a) or Table 6-(a)) used before switching in the session managing table.

If a result of the determination in step S40 is Yes, the PF switching start determining unit 56 transmits an instruction to start PF switching to each of the transmission terminals 10 (S50). In other words, the PF switching start determining unit 56 transmits the instruction to start PF switching to all of the transmission terminals 10 associated with a communication PF (a record of Se_003 in Table 1-(b) or Table 6-(b)) to be used after switching in the session managing table.

Then, the PF switching start determining unit 56 transmits an instruction to disconnect the session of the communication PF used before the switching to each of the transmission terminals 10 (S60). In other words, the PF switching start determining unit 56 transmits the instruction to disconnect the session to all of the transmission terminals 10 associated with the communication PF (the record of Se_001 in Table 1-(a) or Table 6-(a)) used before switching in the session managing table.

The PF switching start determining unit 56 repeats the process of FIG. 9 until the conference ends (S70). The conference ends when the number of transmission terminals 10 that participate in the session becomes zero through logging out or power-off of the transmission terminal 10.

In this manner, the transmission managing system 50 of the example of FIG. 9 switches the communication PF if the session establishment report is received from all of the transmission terminals 10. Accordingly, it is possible to switch the communication PF when all of the transmission terminals 10 are prepared for communication in the communication PF to be used after switching.

<Another PF Determining Table and Limitation of Switching>

In the following, another preferable PF determining table and limitation of switching are described.

TABLE 7

(PF determining table)

| | Condition | Communication platform |
|---|---|---|
| 1 | All locations are connected to a corporate network and the number of locations is three or less | α (WebRTC, high rate) |
| 2 | 1 is not satisfied, an available band is 5 Mbps or more | δ (High rate, high resolution) |
| 3 | 2 is not satisfied, there is a transmission terminal that uses a mobile communication network | ε (Low quality) |

TABLE 7-continued (PF determining table)

| | Condition | Communication platform |
|---|---|---|
| 4 | 3 is not satisfied, a transmission terminal not mutually described in the destination list is included | ζ (WebRTC, low rate) |
| 5 | 4 is not satisfied, all of transmission terminals are connected by wire | η (High rate, low to intermediate resolution) |
| 6 | Others | β |

In this PF determining table, communication PFs correspond to six conditions. Because Condition 1 includes a condition of a small number of locations, Condition 1 corresponds to the communication PF of α by which communication is performed in WebRTC and at high rate. Because Condition 2 includes a condition of having a greater available band, Condition 2 corresponds to a communication PF of δ by which communication is performed at high rate and with high resolution. Because Condition 3 includes a condition of using a mobile communication network, Condition 3 corresponds to a communication PF of ζ by which communication is performed with low quality so as to deal with fluctuation of a communication band. Because Condition 4 includes a condition of having a transmission terminal not mutually described in the destination list, Condition 4 corresponds to a communication PF of ζ by which communication is performed in WebRTC and at low rate. Because Condition 5 includes a condition of having all of the transmission terminals 10 connected by wire, Condition 5 corresponds to a communication PF of η by which communication is performed at high rate and with low to intermediate resolution.

Condition 1 is further described. Because all locations connected to a corporate network will have reduced delay, if the number of location is small, communication is expected to provide less stress even if WebRTC is used. Condition 2 is further described. The condition of having a greater available band is assumed to hold true if the condition applies to all of the transmission terminals 10. Further, the available band may be reported by the transmission terminal 10 to the transmission managing system 50 or the available band may be determined by the transmission managing system 50.

Condition 3 is further described. It is assumed that whether there is a mobile communication network is reported to the transmission managing system 50 by the transmission terminal 10 or the mobile terminal 20. This may also be determined from type identification information on the transmission terminal 10 or an OS of the mobile terminal 20.

Condition 4 is further described. With the transmission managing system 50 of this example, it is impossible for one transmission terminal 10 to send a connection request to another transmission terminal 10 that is not described in the destination list. For example, it is assumed that the transmission terminal 10aa and the transmission terminal 10ab are mutually registered in the destination list and the transmission terminal 10ab and the transmission terminal 10ac are mutually registered in the destination list. In this case, the transmission terminal 10aa and the transmission terminal 10ab can communicate with each other and the transmission terminal 10ab and the transmission terminal 10ac can communicate with each other. However, the transmission terminal 10aa and the transmission terminal 10ac are not mutually registered in the destination list, so that communication is impossible. In order to enable a video conference among the transmission terminals 10aa, 10ab, and 10ac, Condition 4 is for enabling communication between the transmission terminals 10aa and 10ac using WebRTC, the communication with the transmission terminal 10aa or with the transmission terminal 10ac being possible for the transmission terminal 10ab. The transmission managing system 50 determines that Condition 4 is satisfied if there is a transmission terminal 10 commonly used in two sessions in the session managing table. If Condition 4 is satisfied, the transmission managing system 50 may send, to the transmission terminal 10ab, an inquiry about whether to switch the communication PF or the user of the transmission terminal 10ab may request switching of the communication PF. If the switching is performed, the session managing unit 54 assigns a new session ID to the transmission terminals 10aa, 10ab, and 10ac.

Condition 5 is further described. Whether all of the transmission terminals 10 are connected by wire is preferably reported to the transmission managing system 50 by the transmission terminal 10 or the mobile terminal 20. In addition, if the mobile terminal 20 is connected to the transmission managing system 50, it is possible to determine that this is not a wired connection.

TABLE 8

(Switching restrictive condition table)

| | Restriction type | Restrictions |
|---|---|---|
| 1 | Direction of platform change | Not from δ to α |
| 2 | Restriction of number | Up to three times per conference |
| 3 | Elapsed time from previous change | 60 seconds or more |

In the non-volatile storage unit 5000, the switching restrictive condition managing DB 5006 configured with the switching restrictive condition table as indicated in Table 8 is constructed. In the switching restrictive condition table, restrictions against switching of the communication PF even if the condition of the PF determining table is satisfied are registered.

Switching of the communication PF while a user is holding a video conference makes it possible to perform communication more efficiently in the long run. However, in the short term, there may be demerits such as updating of a screen layout. Accordingly, it is effective to have restriction such as prevention of frequent switching of the communication PF (restriction types 2 and 3 described in the switching restrictive condition table) and not performing switching to a communication PF which may provide greater effects (restriction type 1 described in the switching restrictive condition table) as in this example.

TABLE 9

(PF determining table)

| Current platform | Switching condition | Platform of switching destination |
|---|---|---|
| α | Number of locations is three or more | β |

TABLE 9-continued (PF determining table)

| Current platform | Switching condition | Platform of switching destination |
|---|---|---|
| α | Participation from a mobile communication network | ε |
| γ | Participation from an external network | δ |
| γ | Participation from different country | θ |
| ... | ... | ... |

If the transmission system 1 supports many types of communication PFs, restriction types (restriction type 1) to be registered in the switching restrictive condition table in Table 8 may be greatly enlarged. This is because if there are many types of communication PFs, restrictions are also increased accordingly and if the switching restrictive condition table is deficient such that there is no communication PF as a switching destination, it is necessary to add restrictions.

Accordingly, it is effective to use the PF determining table as in Table 9. Table 9 indicates another example of the PF determining table. In the PF determining table of Table 9, a current communication PF is managed in association with a switching condition and a communication PF as a switching destination. In other words, the PF switching determining unit 52 uses the current communication PF as a key and determines switching to the communication PF of the switching destination if the switching condition is satisfied. The PF determining table is checked from the top and the communication PF is switched only if the switching condition of the current communication PF is met, such that it is possible to prevent the switching restrictive condition table from becoming greatly enlarged.

Example 2

In this example, the transmission system 1 in which a different PF determining table is used for each user to switch a communication PF is described.

In Example 1, the transmission managing system 50 manages the PF determining table. However, a user may wish to employ a different switching condition. In order to realize this, the transmission terminal 10 holds an individual PF determining table or the transmission managing system 50 holds a corresponding PF determining table for a communication ID of each transmission terminal 10 (the transmission terminal 10 obtains the PF determining table from the transmission managing system 50 upon logging in, for example). Each transmission terminal 10 can employ different switching conditions for each user by individually determining whether to perform switching based on its own PF determining table.

However, there may be an inconvenient case where each transmission terminal 10 does not necessarily switch to the same communication PF.

Accordingly, in this example, the above inconvenience is solved by determining whether to perform switching of the communication PF based on majority decision.

Figure 10:
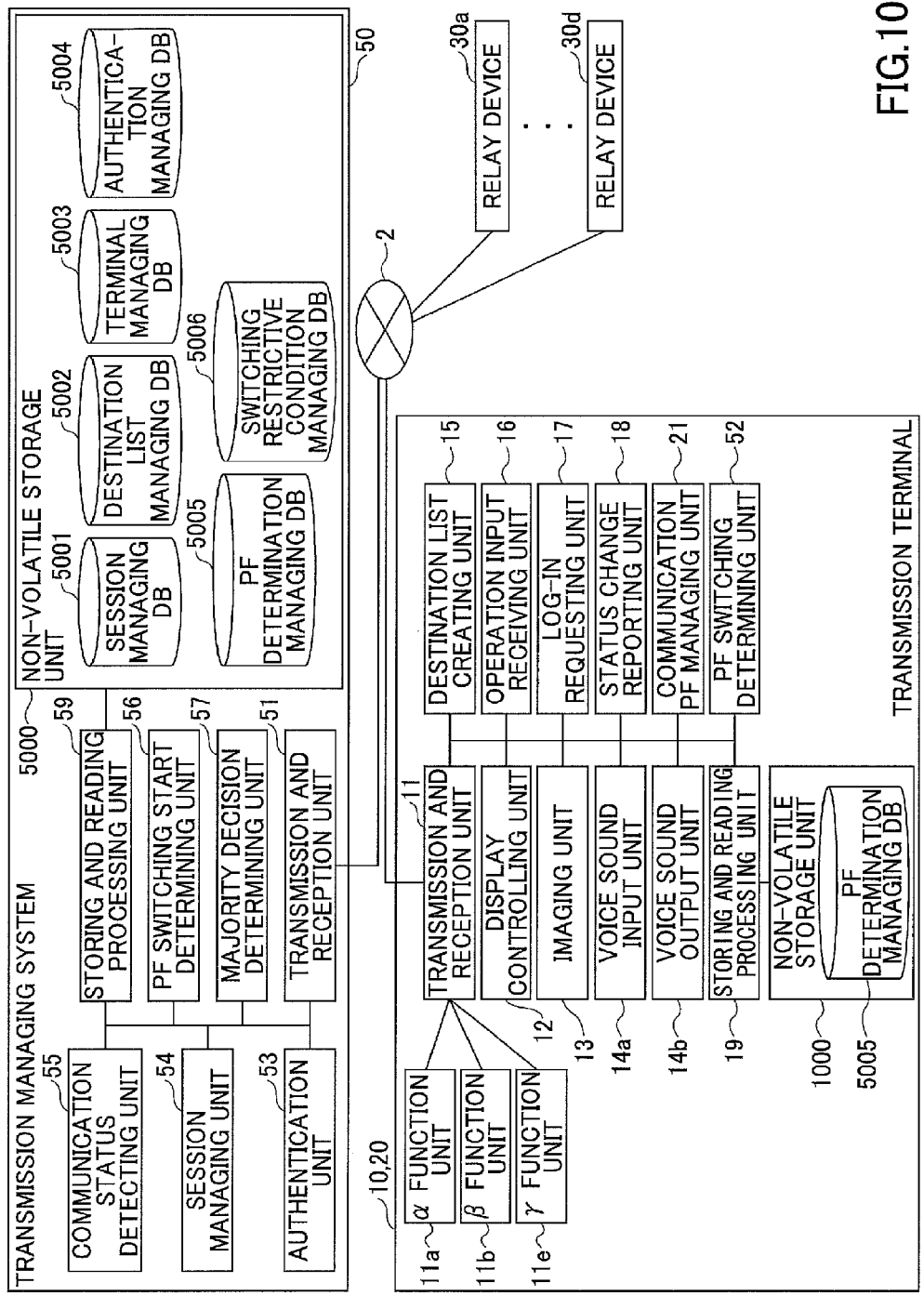
FIG. 10 is a functional block diagram of a transmission terminal and a transmission management system according to an embodiment of the present invention (Example 2)

FIG. 10 is a functional block diagram of the transmission terminal 10 and the transmission managing system 50. In FIG. 10, for constituent elements provided with the same reference numerals as in FIG. 5, a description of such constituent elements described above may be omitted or only a difference may be described.

In this example, the transmission terminal 10 includes the PF switching determining unit 52. A function of the PF switching determining unit 52 is the same as in Example 1. Further, in the non-volatile storage unit 1000, the PF determination managing DB 5005 configured with the PF determining table is constructed. Contents of the PF determining table are the same as in Example 1.

Further, the transmission managing system 50 of the present example includes a majority decision determining unit 57. The majority decision determining unit 57 is implemented by an instruction from the CPU 301 depicted in FIG. 4, for example. The majority decision determining unit 57 determines whether to perform switching of the communication PF by majority decision when a request of switching of a communication PF (switching request) is obtained from the transmission terminal 10.

FIG. 11 is a sequence diagram depicting a procedure by which the transmission managing system 50 determines whether to switch a communication PF. In addition, the transmission terminals 10aa, 10ab, and 10ac are in communication in the communication PF of α.

S1: The status change reporting unit 18 of the transmission terminal 10aa detects some kind of change of a communication status such as a change of a communication band or a change of the number of locations.

S2: The PF switching determining unit 52 of the transmission terminal 10aa refers to its own PF determining table and determines switching of the communication PF to β. In order to do this, the transmission and reception unit 11 sends a request for switching to the communication PF of β.

S3: The majority decision determining unit 57 of the transmission managing system 50 determines whether to switch the communication PF. In this case, the majority decision determining unit 57 determines that the switching is not performed because the transmission terminals 10ab and 10ac do not send a request for switching the communication PF.

S4: Then the status change reporting unit 18 of the transmission terminal 10ab detects some kind of change of a communication status such as a change of a communication band or a change of the number of locations.

S5: The PF switching determining unit 52 of the transmission terminal 10ab refers to its own PF determining table and determines switching of the communication PF to γ. In order to do this, the transmission and reception unit 11 sends a request for switching to the communication PF of γ.

S6: The majority decision determining unit 57 of the transmission managing system 50 determines whether to switch the communication PF. In this case, the majority decision determining unit 57 determines that the switching is not performed because there is only one request for γ.

S7: Then the status change reporting unit 18 of the transmission terminal 10ac detects some kind of change of a communication status such as a change of a communication band or a change of the number of locations.

S8: The PF switching determining unit 52 of the transmission terminal 10ac refers to its own PF determining table and determines switching of the communication PF to β. In order to do this, the transmission and reception unit 11 sends a request for switching to the communication PF of β.

S9: The majority decision determining unit 57 of the transmission managing system 50 determines switching of the communication PF to β because the number of the requests for β is two and exceeds the majority of the number of all of the terminals that are holding a video conference. In addition, a period during which the number of requests is counted may be limited (the number of requests may be initialized in each ten minutes, for example) or all requests from a start of the conference may be accumulated and counted.

S10 to S12: The majority decision determining unit 57 of the transmission managing system 50 sends, to the transmission terminals 10aa, 10ab, and 10ac, an instruction to switch the platform to the communication PF of β. In other words, the majority decision determining unit 57 sends an instruction to switch the platform as in steps S5.2 and S5.3 depicted in FIGS. 6 and 7. The subsequent procedure is the same as in FIGS. 6 and 7.

In accordance with this, the transmission terminals 10aa, 10ab, and 10ac can continue the video conference while switching the communication PF to β without causing discontinuation of communication.

Thus, according to the transmission system 1 or a communication method in Example 2, it is possible to use a different PF determining table for each user, individually send a request for switching of a communication PF, and switch to the most requested communication PF.

Other than the determination by majority decision, a request from a host of the conference may be preferentially selected. Further, priority may be given to communication PFs and a communication PF that has the highest priority may be selected from requested communication PFs.

<Other Application>

While the best mode for carrying out the present invention is described above using examples, the present invention is not limited at all to these examples but various types of modifications and replacements may be added without departing from the scope of the present invention.

For example, the configuration in FIG. 5 is illustrated by dividing elements based on main functions for ease of understanding of a process performed by the transmission managing system 50 and the transmission terminal 10. The present invention is not limited by how process units are divided or names. The process of the transmission managing system 50 and the transmission terminal 10 may be further divided into more process units depending on processing contents. Further, one process unit may be further divided to include more processing.

Further, one or more of databases included in the non-volatile storage unit 5000 of the transmission managing system 50 may be present on a communication network. The same also applies to the database included in the non-volatile storage unit 1000 of the transmission terminal 10.

Further, the transmission system 1 may include a plurality of transmission managing systems 50 and functions of the transmission managing systems 50 may be disposed in a plurality of servers in a dispersed manner.

The PF switching determining unit 52 is an example of a determination unit. The communication status detecting unit 55 is an example of a status detector. The session managing unit 54 is an example of a communication establishing unit. The PF switching start determining unit 56 is an example of a communication starter.

According to an embodiment of the present invention, it is possible to provide an information processing apparatus capable of preventing discontinuation of communication when switching of a communication platform.

Further, the present invention is not limited to these embodiments, and various variations and modifications may be made without departing from the scope of the present invention.

The present application claims priority under 35 U.S.C. § 119 to Japanese Patent Application No. 2015-141531, filed Jul. 15, 2015. The contents of which are incorporated herein by reference in their entirety.

What is claimed is:

1. An information processing apparatus for controlling establishment of communication between a plurality of communication terminals, the information processing apparatus comprising:
processing circuitry configured to:
cause, while communication via a first session is established between the plurality of communication terminals, the plurality of communication terminals to establish communication via a second session; and
cause the plurality of communication terminals to start the communication via the second session upon confirming that the communication via the second session is established between the plurality of communication terminals;
wherein the first session is for communication using a first communication platform and the second session is for communication using a second communication platform,
wherein in a case of switching the first communication platform to the second communication platform, the processing circuitry configured to cause the plurality of communication terminals to start causes the plurality of communication terminals to start the communication using the second communication platform upon confirming that the communication using the second communication platform is established between the plurality of communication terminals, and
wherein the processing circuitry is further configured to:
detect a communication status between the plurality of communication terminals or a communication status between one of the plurality of communication terminals and the information processing apparatus; and
determine switching from the first communication platform to the second communication platform in response to a change of the communication status and based on a communication band being used,
wherein the determine switching determines whether to use the first communication platform, or whether to switch to the second communication platform selects a communication platform to be used based on conditions including:
1. all communications are connected to a corporate network and a number of locations is three or less,
2. condition 1 is not satisfied, an available band is 5 Mbps or more,
3. condition 2 is not satisfied, and at least one of the plurality of communication terminals is a transmission terminal that uses a mobile communication network,
4. condition 3 is not satisfied, and at least one of the plurality of communication terminals is not described in a destination list, and
5. condition 4 is not satisfied, and all of transmission terminals are connected by wire,
wherein the determine switching is further performed based on whether conditions are satisfied including:
a. restrictions of changing from a particular platform to another platform,
b. restriction on a number of times platforms can be switched during a conference, and
c. restrictions on an elapsed time from a previous change.

2. The information processing apparatus according to claim 1, wherein:
the processing circuitry which causes the plurality of communication terminals to start the communication confirms that the communication using the second communication platform is established between the plurality of communication terminals upon receiving a report that the communication using the second communication platform is established from all of the plurality of communication terminals, the plurality of communication terminals being in the communication using the first communication platform.

3. The information processing apparatus according to claim 1, wherein:
the processing circuitry which causes the plurality of communication terminals to start the communication causes the plurality of communication terminals to switch from communication of data using the first communication platform to communication of data using the second communication platform upon confirming that the communication using the second communication platform is established between the plurality of communication terminals.

4. The information processing apparatus according to claim 1, wherein:
the processing circuitry which causes the plurality of communication terminals to start the communication causes the plurality of communication terminals to disconnect the communication, the communication using the first communication platform and being established between the plurality of communication terminals, upon confirming that the communication using the second communication platform is established between the plurality of communication terminals.

5. A communication system in which a plurality of communication terminals are in communication, the communication system comprising:
processing circuitry configured to:
establish, while communication via a first session is established between the plurality of communication terminals, communication via a second session; and
cause the plurality of communication terminals to start the communication via the second session upon confirming that the communication via the second session is established between the plurality of communication terminals;
wherein the first session is for communication using a first communication platform and the second session is for communication using a second communication platform,
wherein in a case of switching the first communication platform to the second communication platform, the processing circuitry configured to cause the plurality of communication terminals to start causes the plurality of communication terminals to start the communication using the second communication platform upon confirming that the communication using the second communication platform is established between the plurality of communication terminals, and
wherein the processing circuitry is further configured to:
detect a communication status between the plurality of communication terminals or a communication status between one of the plurality of communication terminals and the communication system; and
determine switching from the first communication platform to the second communication platform in response to a change of the communication status and based on a communication band being used, wherein the determine switching determines whether to use the first communication platform, or whether to switch to the second communication platform selects a communication platform to be used based on conditions including:
1. all communications are connected to a corporate network and a number of locations is three or less,
2. condition 1 is not satisfied, an available band is 5 Mbps or more,
3. condition 2 is not satisfied, and at least one of the plurality of communication terminals is a transmission terminal that uses a mobile communication network,
4. condition 3 is not satisfied, and at least one of the plurality of communication terminals is not described in a destination list, and
5. condition 4 is not satisfied, and all of transmission terminals are connected by wire,
wherein the determine switching is further performed based on whether conditions are satisfied including:
a. restrictions of changing from a particular platform to another platform,
b. restriction on a number of times platforms can be switched during a conference, and
c. restrictions on an elapsed time from a previous change.

6. A communication system comprising:
a non-transitory recording medium storing a computer-readable program that, when executed by a computer, causes the computer to send a report of a change of a communication status to an information processing apparatus;
processing circuitry configured to:
establish, while communication via a first session is established between a plurality of communication terminals, communication via a second session; and
to cause the plurality of communication terminals to start the communication via the second session upon confirming that the communication via the second session is established between the plurality of communication terminals,
wherein the first session is for communication using a first communication platform and the second session is for communication using a second communication platform,
wherein in a case of switching the first communication platform to the second communication platform, the processing circuitry configured to cause the plurality of communication terminals to start causes the plurality of communication terminals to start the communication using the second communication platform upon confirming that the communication using the second communication platform is established between the plurality of communication terminals, and
wherein the processing circuitry is further configured to:
detect a communication status between the plurality of communication terminals or a communication status between one of the plurality of communication terminals and the information processing apparatus; and
determine switching from the first communication platform to the second communication platform in response to a change of the communication status and based on a communication band being used,
wherein the determine switching determines whether to use the first communication platform, or whether to switch to the second communication platform selects a communication platform to be used based on conditions including:
1. all communications are connected to a corporate network and a number of locations is three or less,
2. condition 1 is not satisfied, an available band is 5 Mbps or more,
3. condition 2 is not satisfied, and at least one of the plurality of communication terminals is a transmission terminal that uses a mobile communication network,
4. condition 3 is not satisfied, and at least one of the plurality of communication terminals is not described in a destination list, and
5. condition 4 is not satisfied, and all of transmission terminals are connected by wire,
wherein the determine switching is further performed based on whether conditions are satisfied including:
a. restrictions of changing from a particular platform to another platform,
b. restriction on a number of times platforms can be switched during a conference, and
c. restrictions on an elapsed time from a previous change.

7. A non-transitory recording medium storing a computer-readable program that, when installed on an information processing apparatus, causes the information processing apparatus to function as:
a processor configured to:
establish, while communication via a first session is established between a plurality of communication terminals, communication via a second session; and
cause the plurality of communication terminals to start the communication via the second session upon confirming that the communication via the second session is established between the plurality of communication terminals,
wherein the first session is for communication using a first communication platform and the second session is for communication using a second communication platform,
wherein in a case of switching the first communication platform to the second communication platform, the processing circuitry configured to cause the plurality of communication terminals to start causes the plurality of communication terminals to start the communication using the second communication platform upon confirming that the communication using the second communication platform is established between the plurality of communication terminals, and
wherein the non-transitory recording medium further causes the information processing apparatus to function as the processor which is further configured to:
detect a communication status between the plurality of communication terminals or a communication status between one of the plurality of communication terminals and the information processing apparatus; and
determine switching from the first communication platform to the second communication platform in response to a change of the communication status and based on a communication band being used,
wherein the determine switching determines whether to use the first communication platform, or whether to switch to the second communication platform selects a communication platform to be used based on conditions including:
1. all communications are connected to a corporate network and a number of locations is three or less,
2. condition 1 is not satisfied, an available band is 5 Mbps or more, 3. condition 2 is not satisfied, and at least one of the plurality of communication terminals is a transmission terminal that uses a mobile communication network,
4. condition 3 is not satisfied, and at least one of the plurality of communication terminals is not described in a destination list, and
5. condition 4 is not satisfied, and all of transmission terminals are connected by wire, wherein the determine switching is further performed based on whether conditions are satisfied including:
a. restrictions of changing from a particular platform to another platform,
b. restriction on a number of times platforms can be switched during a conference, and
c. restrictions on an elapsed time from a previous change.

8. An information processing apparatus for controlling establishment of communication between a plurality of communication terminals, the information processing apparatus comprising:
processing circuitry configured to:
cause, while communication via a first session is established between the plurality of communication terminals, the plurality of communication terminals to establish communication via a second session; and
cause the plurality of communication terminals to start the communication via the second session upon confirming that the communication via the second session is established between the plurality of communication terminals;
wherein the first session is for communication using a first communication platform and the second session is for communication using a second communication platform,
wherein in a case of switching the first communication platform to the second communication platform, the processing circuitry configured to cause the plurality of communication terminals to start causes the plurality of communication terminals to start the communication using the second communication platform upon confirming that the communication using the second communication platform is established between the plurality of communication terminals, and
wherein the processing circuitry is further configured to:
detect a communication status between the plurality of communication terminals or a communication status between one of the plurality of communication terminals and the information processing apparatus; and
determine switching from the first communication platform to the second communication platform in response to a change of the communication status and based on a communication band being used,
wherein the determine switching determines whether to use the first communication platform, or whether to switch to the second communication platform selects a communication platform to be used based on conditions including:
i. a number of locations of the plurality of communication terminals,
ii. whether there is participation from a mobile communications network,
iii. whether there is participation from an external network, and
iv. whether there is participation from a foreign country.

* * * * *